(12) United States Patent
Yoneda et al.

(10) Patent No.: US 11,226,025 B2
(45) Date of Patent: Jan. 18, 2022

(54) ELECTRIC VEHICLE AND DRIVETRAIN THEREOF

(71) Applicant: Yamaha Hatsudoki Kabushiki Kaisha, Shizuoka-ken (JP)

(72) Inventors: Yuichi Yoneda, Shizuoka (JP); Asaki Fujiwara, Shizuoka (JP)

(73) Assignee: YAMAHA HATSUDOKI KABUSHIKI KAISHA, Shizuoka-Ken (JP)

( * ) Notice: Subject to any disclaimer, the term of this patent is extended or adjusted under 35 U.S.C. 154(b) by 782 days.

(21) Appl. No.: 15/976,882

(22) Filed: May 11, 2018

(65) Prior Publication Data
US 2018/0328455 A1    Nov. 15, 2018

(30) Foreign Application Priority Data

May 12, 2017    (JP) .............................. JP2017-095369

(51) Int. Cl.
*F16H 3/10* (2006.01)
*F16H 3/089* (2006.01)

(52) U.S. Cl.
CPC .............. *F16H 3/089* (2013.01); *F16H 3/10* (2013.01); *F16H 2200/0034* (2013.01); *F16H 2200/0039* (2013.01); *F16H 2200/2087* (2013.01)

(58) Field of Classification Search
CPC .... F16H 3/089; F16H 3/10; F16H 2200/0034; F16H 2200/0039; F16H 2200/2087
See application file for complete search history.

(56) References Cited

U.S. PATENT DOCUMENTS

| 8,801,556 B2 * | 8/2014 | Kato .................... B60W 30/19 475/5 |
| 9,415,691 B2 | 8/2016 | Murakami et al. |
| 2012/0061158 A1 | 3/2012 | Gotou |
| 2012/0309576 A1 * | 12/2012 | Kato .................... F16H 3/725 475/5 |

(Continued)

FOREIGN PATENT DOCUMENTS

| DE | 10329109 A1 | 1/2004 |
| GB | 700367 | * 12/1953 |
| JP | S56-124744 A | 9/1981 |

(Continued)

OTHER PUBLICATIONS

Office Action dated Jan. 30, 2020, for corresponding EP Patent Application No. 18171253.0.

(Continued)

*Primary Examiner* — William C Joyce
(74) *Attorney, Agent, or Firm* — HEA Law PLLC

(57) ABSTRACT

A drivetrain has a first speed path and a third speed path. The first speed path includes a one-way clutch that allows power transmission from the drive shaft toward the driven shaft but prevents power transmission in the opposite direction. The third speed path includes a one-way clutch that allows power transmission from the driven shaft toward the drive shaft but prevents power transmission in the opposite direction. The third speed path further includes a shift clutch member. This can provide a drivetrain capable of performing regenerative control to derive electricity appropriately from an electric motor and also capable of shifting gears smoothly.

11 Claims, 14 Drawing Sheets

(56) References Cited

U.S. PATENT DOCUMENTS

2016/0017958 A1* 1/2016 Wu .................. F16H 3/089
74/664

FOREIGN PATENT DOCUMENTS

| | | | |
|---|---|---|---|
| JP | 2007-298145 | * | 11/2005 |
| JP | 2012-206604 | A | 10/2012 |
| JP | 2013-208994 | A | 10/2013 |
| JP | 2015-135174 | A | 7/2015 |

OTHER PUBLICATIONS

Search Report dated Oct. 30, 2018, for corresponding EP Patent Application No. 18171253.0.

* cited by examiner

ELECTRIC VEHICLE AND DRIVETRAIN THEREOF

The present application claims priority from Japanese application JP 2017-095369, filed on May 12, 2017, the content of which is hereby incorporated by reference into this application.

FIELD OF THE INVENTION

The present invention relates to an electric vehicle and a drivetrain of the electric vehicle.

BACKGROUND OF THE INVENTION

Description of the Related Art

Electric vehicles each including an electric motor as a drive source have been developed. JP 2012-206604 A (hereinafter, referred to as "Patent Literature 1") discloses an electric motorcycle including a transmission in a power transmission path from its electric motor to its driving rear wheel. The transmission proposed in Patent Literature 1 has two power transmission paths, each with different gear ratios. Each power transmission path also includes a one-way clutch. According to Patent Literature 1, the power of the electric motor rotating in its normal direction is transmitted to the drive wheel through a first power transmission path. The one-way clutch in a second power transmission path does not transmit that power. In contrast, the power of the electric motor rotating in its reverse direction is transmitted to the drive wheel through the second power transmission path. The one-way clutch in the first power transmission path does not that power.

SUMMARY OF THE INVENTION

Some electric vehicles perform regenerative control during deceleration. Regenerative control converts power transmitted from a drive wheel to an electric motor into electricity, thus charging a battery with the generated electricity and providing braking force. With the structure disclosed in Patent Literature 1, however, the workings of the one-way clutches prevent both power transmission paths from transmitting the power of the rear wheel to the electric motor during deceleration of the vehicle. Thus, regenerative control cannot be performed. Moreover, according to Patent Literature 1, the electric motor needs to be reversed during gear shifting, which makes it difficult to shift gears smoothly.

In some cases, a user of a small electric vehicle such as an electric motorcycle wishes to push the vehicle backward. When the vehicle is backed up, its rear wheel rotates reversely. If the reverse rotation of the rear wheel is transmitted toward the electric motor through both the two power transmission paths, gears and shafts in the two power transmission paths become locked and thus the rear wheel becomes unable to rotate.

It is a first object of embodiments of the present disclosure to provide a drivetrain and an electric vehicle that are capable of performing regenerative control to generate electricity well using an electric motor, and also capable of shifting gears smoothly.

It is a second object of embodiment of this disclosure to provide a drivetrain and an electric vehicle that are capable of performing regenerative control to generate electricity well using an electric motor, and to also allow its user to push the vehicle backwards.

(1) A drivetrain according to an embodiment of the present invention includes a drive shaft to which power is transmitted from an electric motor, a driven shaft for transmitting power from the drive shaft to a drive wheel, a first power transmission path that transmits power between the drive shaft and the driven shaft, and a second power transmission path that transmits power between the drive shaft and the driven shaft. The first power transmission path includes two meshing gears and a first one-way clutch. Two meshing gears are respectively mounted on the drive shaft and the driven shaft. One of the gears is defined as a first gear. The first one-way clutch transmits power between the first gear and the shaft having the first gear mounted on it. The first one-way clutch allows power transmission from the drive shaft toward the driven shaft but prevents power transmission from the driven shaft toward the drive shaft. The second power transmission path includes two meshing gears and a second one-way clutch. Two meshing gears are respectively mounted on the drive shaft and the driven shaft. One of the gears is defined as a second gear. The second one-way clutch transmits power between the second gear and the shaft having the second gear mounted on it. The second one-way clutch allows power transmission from the driven shaft toward the drive shaft but prevents power transmission from the drive shaft toward the driven shaft. The second power transmission path further includes a shift clutch member movable between connection and disconnection positions relative to the second gear. The shift clutch member at the connection position connects the second gear and the shaft having the second gear mounted on it so that they rotate together. The shift clutch member at the disconnection position disconnects the second gear and the shaft having the second gear mounted on it.

This drivetrain smoothly switches between the first and second power transmission paths by moving the shift clutch member. During deceleration of a vehicle, power is transmitted from the driven shaft to the drive shaft through the second power transmission path, regardless of the position of the shift clutch member. Consequently, the drivetrain regulates the rotational speed transmitted to the electric motor and thus generates electricity well using the electric motor.

(2) A drivetrain according to an embodiment of the present invention includes a drive shaft to which power is transmitted from an electric motor, a driven shaft for transmitting power from the drive shaft to a drive wheel, a first power transmission path that transmits power between the drive shaft and the driven shaft, and a second power transmission path that transmits power between the drive shaft and the driven shaft. The first power transmission path includes two meshing gears and a first one-way clutch. Two meshing gears are respectively mounted on the drive shaft and the driven shaft. One of the gears is defined as a first gear. The first one-way clutch transmits power between the first gear and the shaft having the first gear mounted on it. The first one-way clutch allows power transmission from the drive shaft toward the driven shaft but prevents power transmission from the driven shaft toward the drive shaft. The second power transmission path includes two meshing gears and a second one-way clutch. Two meshing gears are respectively mounted on the drive shaft and the driven shaft. One of the gears is defined as a second gear. The second one-way clutch transmits power between the second gear and the shaft having the second gear mounted on it. The second one-way clutch allows power transmission from the driven shaft toward the drive shaft but prevents power transmission from the drive shaft toward the driven shaft. One of the two gears of the first power transmission path is rotatable both in normal and reverse directions relative to the shaft having the one gear mounted on it. The first power transmission path further includes a neutral clutch member movable between connection and disconnection positions relative to one gear of the first power transmission path. The neutral clutch member at the connection position connects the one gear and the shaft so that they rotate together. The neutral clutch member at the disconnection position disconnects the one gear and the shaft.

This drivetrain prevents the first power transmission path from transmitting the rotation of the drive wheel to the electric motor by placing the neutral clutch member at the disconnection position when a vehicle is backed up. Thus, a user can push the vehicle backward. During deceleration of the vehicle, power (rotation) is transmitted from the driven shaft to the drive shaft through the second power transmission path, which is different from the first power transmission path that transmits the power of the electric motor to the drive wheel. Consequently, the drivetrain regulates the rotational speed transmitted to the electric motor and thus generates electricity well using the electric motor.

(3) In the drivetrain according to (1) or (2), the speed ratio between the two gears in the second power transmission path may be smaller than the speed ratio between the two gears in the first power transmission path. This reduces the rotational speed transmitted to the electric motor through the second power transmission path during deceleration of the vehicle.

(4) In the drivetrain according to (1) or (2), one of the two gears of the first power transmission path may have a larger diameter than the other. The first gear may be the one gear having the larger diameter. This makes it easier to lay out the first one-way clutch.

(5) In the drivetrain according to (1) or (2), the first one-way clutch may be mounted on one of the drive and driven shafts. The second one-way clutch may be mounted on the other of the drive and driven shafts. This allows the first and second one-way clutches to be arranged without any substantial increase in the width of the drivetrain.

(6) In the drivetrain according to (1) or (2), the first one-way clutch may be mounted on the driven shaft and located inside the first gear. The second one-way clutch may be mounted on the drive shaft and located inside the second gear. Gears on a drive shaft usually have larger diameters than the corresponding gears on a driven shaft. It is thus easier to lay out the first one-way clutch in this form of drivetrain. In contrast to the first one-way clutch, the second one-way clutch is mounted on the drive shaft. This allows the first and second one-way clutches to be arranged without any substantial increase in the width of the drivetrain.

(7) In the drivetrain according to (6), the first gear may have a narrower width than the first one-way clutch, or the second gear may have a narrower width than the second one-way clutch. This avoids a substantial increase in the width of the drivetrain. "The width of each gear" is the tooth width of the gear, which is measured axially along the drive shaft and the driven shaft.

(8) The drivetrain according to (1) or (2) may further include a third power transmission path. The third power transmission path may include two meshing gears and a third one-way clutch. Two meshing gears are respectively mounted on the drive shaft and the driven shaft. One of the gears is defined as a third gear. The third one-way clutch transmits power between the third gear and the shaft having the third gear mounted on it. The third one-way clutch allows power transmission from the drive shaft toward the driven shaft but prevents power transmission from the driven shaft toward the drive shaft. The drivetrain may have a transmission mechanism for allowing or preventing the third power transmission path to transmit power. This increases the number of selectable power transmission paths, thus providing a speed ratio that suits the driving state of the vehicle.

(9) In the drivetrain according to (8), one of the two gears of the third power transmission path may be rotatable both in normal and reverse directions relative to the shaft having the one gear mounted on it. The transmission mechanism may include a shift clutch member movable between connection and disconnection positions relative to the relatively movable one gear. The shift clutch member at the connection position connects the one gear and the shaft so that they rotate together. The shift clutch member at the disconnection position disconnects the one gear and the shaft.

(10) In the drivetrain according to (1), the first one-way clutch may be mounted on one of the drive and driven shafts. The shift clutch member and the second one-way clutch may be mounted on the other of the drive and driven shafts. This makes it easier to lay out the two one-way clutches and the shift clutch member.

(11) In the drivetrain according to (2), one of the drive and driven shafts may be mounted with a rotary member rotatable both in normal and reverse directions relative to the one shaft. The first one-way clutch may be located outside the rotary member and inside the first gear. The neutral clutch member may be mounted on the same shaft as the first one-way clutch and the rotary member. The neutral clutch member at the connection position may be engaged with the rotary member. The neutral clutch member at the disconnection position may be disengaged from the rotary member.

(12) In the drivetrain according to (1), one of the two gears of the first power transmission path may be rotatable both in normal and reverse directions relative to the shaft having the one gear mounted on it. The first power transmission path may further include a neutral clutch member movable between connection and disconnection positions relative to the one gear on the first power transmission path. The neutral clutch member at the connection position connects the one gear and the shaft so that they rotate together. The neutral clutch member at the disconnection position disconnects the one gear and the shaft.

(13) In the drivetrain according to (12), the neutral clutch member may be mounted on one of the drive and driven shafts. The shift clutch member may be mounted on the other of the drive and driven shafts. This makes it easier to lay out the neutral clutch member and the shift clutch member.

(14) An electric according to an embodiment of the present invention includes the drivetrain according to (1) or (2) and an electric motor as a drive source.

Other objects and features of this invention will be in part apparent and in part point pointed out hereinafter.

BRIEF DESCRIPTION OF THE DRAWINGS

The following drawings illustrate examples of various components of the invention disclosed herein, and are for illustrative purposes only.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises", "comprising", "includes", and/or "including", when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

The present invention will now be described by referencing the appended figures representing embodiments. The present disclosure describes an electric motorcycle as an example electric vehicle. The present invention may be applied to electric four-wheel vehicles, electric three-wheel vehicles, and also snowmobiles.

Figure 1:
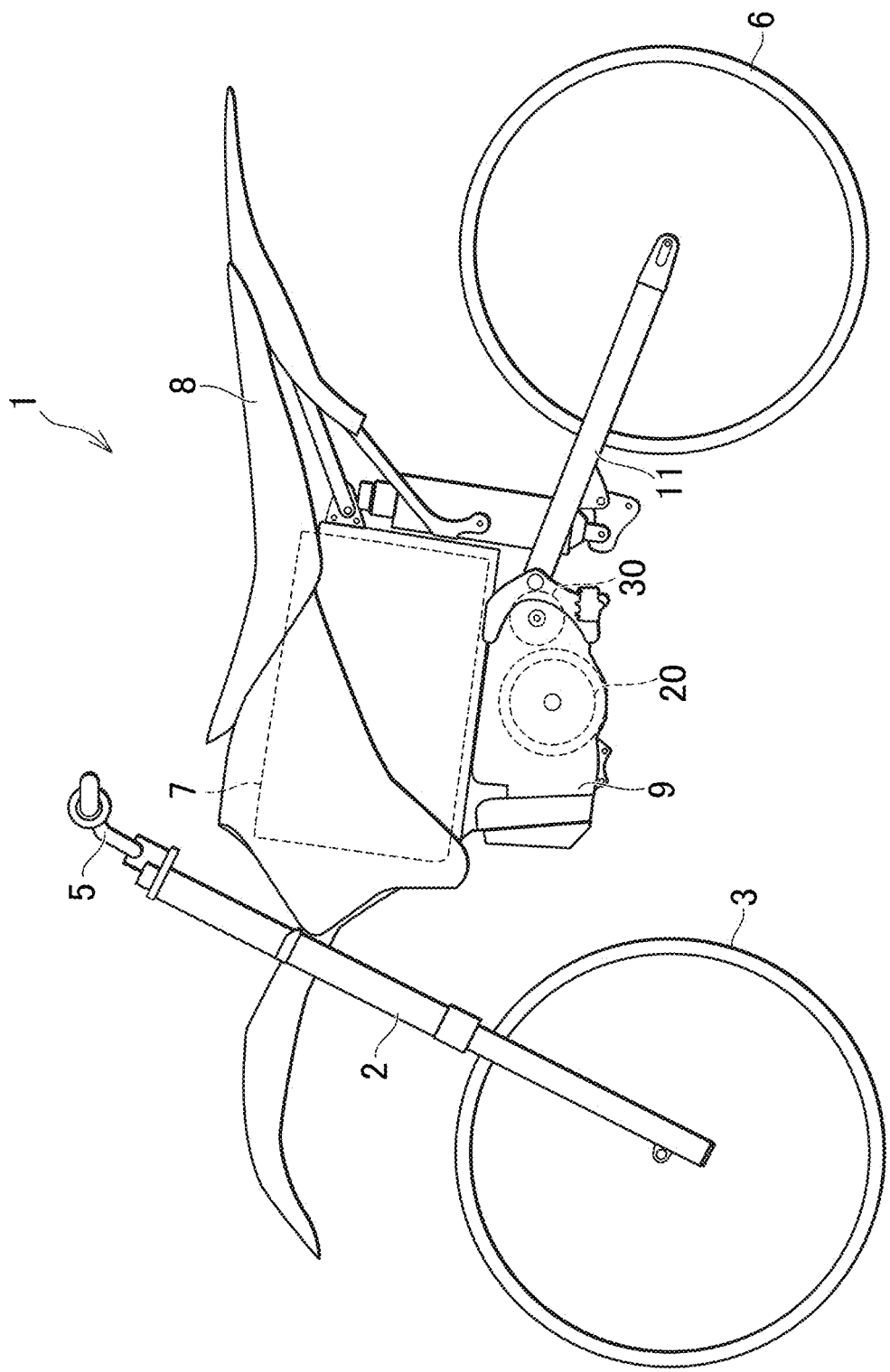
FIG. 1 is a side view of an electric motorcycle that is an example electric vehicle proposed in the present disclosure.

As shown in FIG. 1, an electric motorcycle 1 includes a steering front wheel 3 and a driving rear wheel 6. The axle of the front wheel 3 is supported between the lower ends of a front fork 2. A steering handlebar 5 is fixed at the top of the front fork 2. A seat 8 is mounted behind the steering handlebars 5.

The electric motorcycle 1 includes an electric motor 20 for powering the vehicle and a battery 7 that stores electricity to be supplied to the electric motor 20. The electric motor 20 is coupled to the rear wheel 6 through a drivetrain 30, a chain (not shown), and other parts. During deceleration of the vehicle, the rotation of the rear wheel 6 is transmitted to the electric motor 20 through the power transmission path. The electric motor 20 functions as a generator that converts the rotation of the rear wheel 6 into electricity. The electricity output from the electric motor 20 is used to charge the battery 7 or used to power other electrical components (e.g., a headlight (not shown)) of the electric motorcycle 1. That is, the electric motorcycle 1 performs regenerative control during deceleration. The term "regenerative" used herein includes not only the supply of electricity generated by the electric motor 20 to the battery 7 but also the supply of the electricity to other electrical components.

In the electric motorcycle 1, the battery 7 is located below the front of the seat 8, and a casing 9 is located below the battery 7. The electric motor 20 and the drivetrain 30 are housed in the casing 9. The rear wheel 6 is located behind the casing 9. The axle of the rear wheel 6 is supported by a swing arm 11 extending rearward from the casing 9. The arrangement of the battery 7 and the electric motor 20 is not limited to the above example, and may be changed as appropriate.

Electric Motor

Figure 2A:
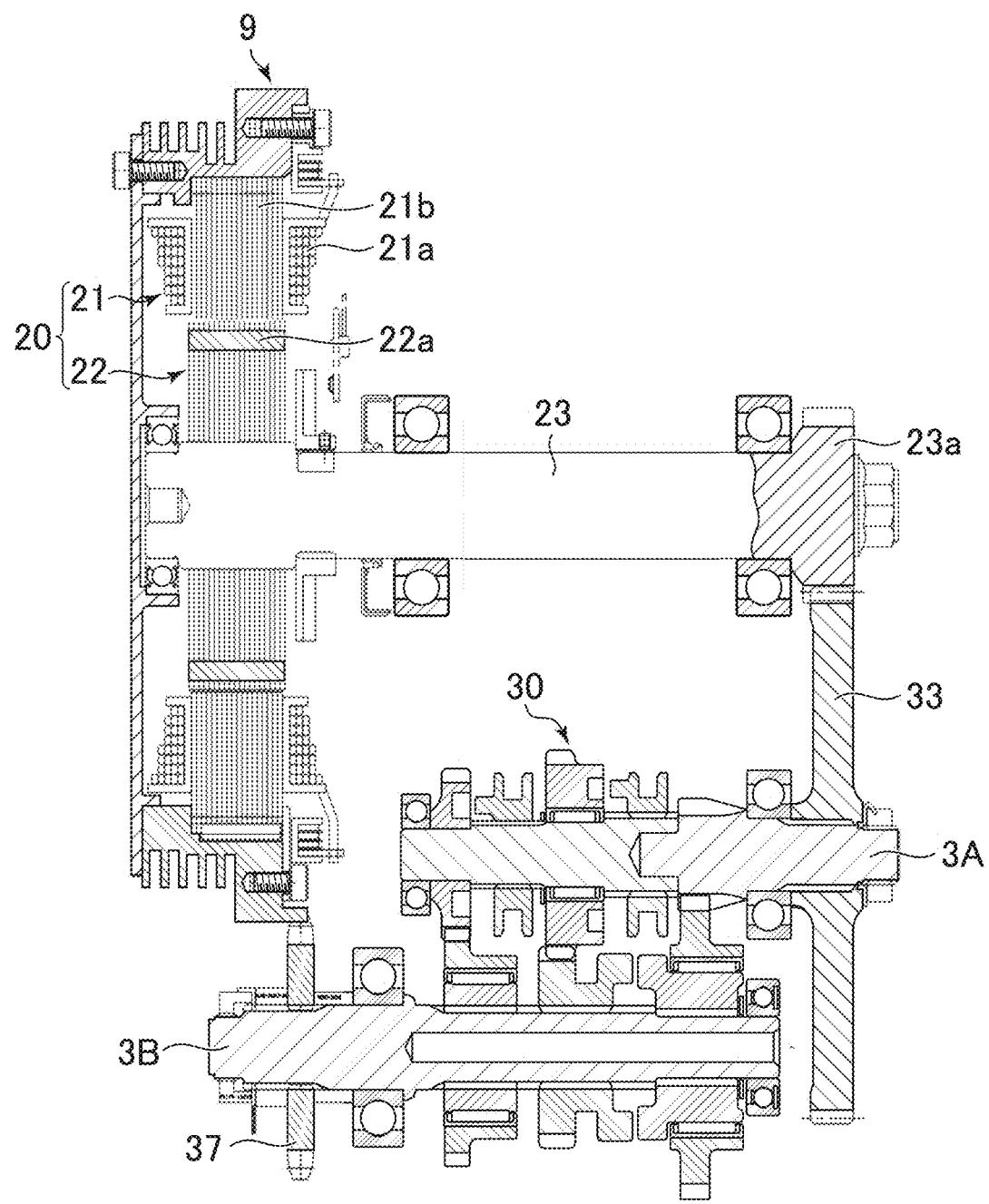
FIG. 2A is a cross-sectional view of a drivetrain.

As shown in FIG. 2A, the electric motor 20 includes a stator 21 fixed to the casing 9 and a rotor 22 mounted on a motor shaft 23. The rotor 22 is rotatable together with the motor shaft 23. In the electric motorcycle 1, a plurality of coils 21a and iron cores 21b of the stator 21 are arranged in a circle, inside which the rotor 22 is located. The rotor 22 has a permanent magnet 22a. The permanent magnet 22a of the rotor 22 and the stator 21 face each other in the direction perpendicular to the axial direction of the motor shaft 23. That is, the electric motor 20 is a radial gap motor. In contrast to the above example, the rotor 22 and the stator 21 may face each other in the axial direction of the motor shaft 23. That is, the electric motor 20 may be an axial gap motor. The electric motor 20 is, for example, a three-phase AC motor. The type and construction of the electric motor 20 are not limited to the above example.

Drivetrain

As shown in FIG. 2A, the drivetrain 30 includes a drive shaft 3A, to which power (rotation) is transmitted from the electric motor 20, and a driven shaft 3B, to which power is transmitted from the drive shaft 3A. The power received by the driven shaft 3B is transmitted to the driving rear wheel 6.

In the electric motorcycle 1, a primary driven gear 33 and a primary drive gear 23a are respectively mounted on the drive shaft 3A and the motor shaft 23. The primary drive gear 23a is meshed with the primary driven gear 33. The power of the electric motor 20 is transmitted to the drive shaft 3A through the primary drive gear 23a and the primary driven gear 33. The power transmission path from the electric motor 20 to the drive shaft 3A is not limited to the above example. For example, the electric motor 20 may be coaxial with the drive shaft 3A. In this case, the electric motorcycle 1 need not include the primary drive gear 23a and the primary driven gear 33.

The driven shaft 3B is coupled to the axle of the rear wheel 6 through power transmission members such as a chain, a shaft, a belt, gears, etc. In the electric motorcycle 1, as shown in FIG. 2A, a sprocket 37 is mounted on the driven shaft 3B. The driven shaft 3B is coupled to the axle of the rear wheel 6 through a chain engaged on the sprocket 37. In contrast to the above example, a gear (e.g., a bevel gear) engaged with a shaft may be mounted on the driven shaft 3B. Alternatively, a pulley on which a belt is to be put may be mounted on the driven shaft 3B. In still another example, the driven shaft 3B may be coaxial with and rotatable together with the axle of the rear wheel 6. In this case, the electric motorcycle 1 need not include any power transmission member, such as a chain, a shaft, or a belt.

Power Transmission Path

Figure 2B:
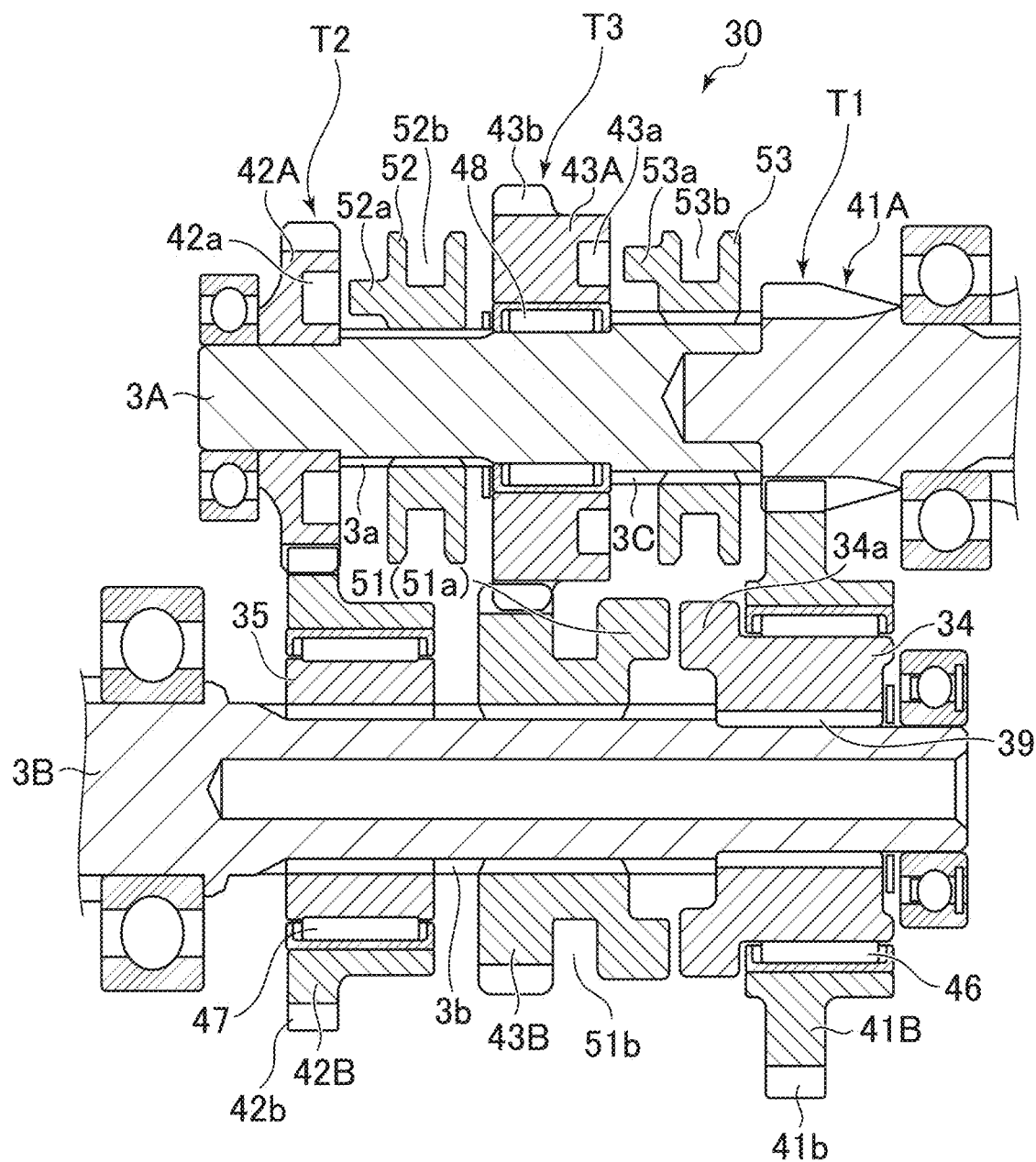
FIG. 2B is a partial enlarged view of FIG. 2A.

The drivetrain 30 has a plurality of power transmission paths that transmit power between the drive shaft 3A and the driven shaft 3B. In the electric motorcycle 1, as shown in FIG. 2B, the drivetrain 30 has three power transmission paths T1, T2, and T3 with different speed ratios. That is, the drivetrain 30 has, as its power transmission paths, the path T1 constituting the first speed, the path T2 constituting the second speed, and the path T3 constituting the third speed. While the vehicle is being driven, one of the three paths T1, T2, and T3 is selected depending on the driving state (at what speed the vehicle is traveling and how the accelerator is being controlled). Which path to select may be determined by a controller (not shown) of the vehicle or manually determined by the vehicle operator. Hereinafter, the three paths T1, T2, and T3 are distinguishably referred to as the first speed path, the second speed path, and the third speed path, respectively.

In the drivetrain 30, the first speed path T1 corresponds to a "first power transmission path" in the claims, the third speed path T3 corresponds to a "second power transmission path" in the claims, and the second speed path T2 corresponds to a "third power transmission path" in the claims.

As shown in FIG. 2B, each of the paths T1, T2, and T3 includes two meshing gears: one is mounted on the drive shaft 3A and the other is mounted on the driven shaft 3B. That is, the paths T1, T2, and T3 respectively include drive gears 41A, 42A, and 43A mounted on the drive shaft 3A. Also, the paths T1, T2, and T3 respectively include driven gears 41B, 42B, and 43B mounted on the driven shaft 3B. Hereinafter, the three drive gears 41A, 42A, and 43A are respectively referred to as the first drive gear, the second drive gear, and the third drive gear. The three driven gears 41B, 42B, and 43B are respectively referred to as the first driven gear, the second driven gear, and the third driven gear. The drive gears 41A, 42A, 43A are respectively meshed with the driven gears 41B, 42B, and 43B.

The speed ratio (gear ratio) Tr1 between the gear 41A and the gear 41B of the first speed path T1, the speed ratio Tr2 between the gear 42A and the gear 42B of the second speed path T2, the speed ratio Tr3 between the gear 43A and the gear 43B of the third speed path T3 have the following relationship: Tr1>Tr2>Tr3. The "speed ratio" between a pair of meshing gears is calculated by dividing the number of teeth of the driven gear by the number of teeth of the drive gear.

As shown in FIG. 2B, the drivetrain 30 includes one-way clutches 46, 47, and 48 in the paths T1, T2, and T3, respectively. As will be described later, even when the power of the electric motor 20 is transmitted to the rear wheel 6 through the first speed path T1 or the second speed path T2, the workings of the one-way clutches 46, 47, and 48 cause the third speed path T3 to transmit the rotation of the rear wheel 6 to the electric motor 20 during deceleration of the vehicle (see FIGS. 3B and 4B). This regulates the rotational speed transmitted to the electric motor 20 during deceleration of the vehicle. For example, it is possible to prevent an excessively high rotational speed from being transmitted to the electric motor 20 through the first speed path T1. It should be noted that the number of power transmission paths of the drivetrain 30 is not limited to three. The number of power transmission paths may be only two or may be more than three.

First speed Path

As described above, the first speed path T1 includes the one-way clutch 46. The one-way clutch 46 allows power (the drive power output from the electric motor 20) to be transmitted from the drive shaft 3A to the driven shaft 3B, but prevents power (the rotation of the rear wheel 6) to be transmitted from the driven shaft 3B to the drive shaft 3A. In the drivetrain 30, the one-way clutch 46 is mounted around the driven shaft 3B and located between the driven shaft 3B and the first driven gear 41B in the radial direction. When the first driven gear 41B rotates in its normal direction relative to the driven shaft 3B (i.e., when the first driven gear 41B rotates in its normal direction faster than the driven shaft 3B), the one-way clutch 46 transmits the rotation of the first driven gear 41B (the drive power from the electric motor 20) to the driven shaft 3B. On the other hand, when the driven shaft 3B rotates in its normal direction relative to the first driven gear 41B (i.e., when the driven shaft 3B rotates in its normal direction faster than the first driven gear 41B), the one-way clutch 46 does not transmit the rotation of the driven shaft 3B (the rotation of the rear wheel 6) to the first driven gear 41B. The term "normal direction" used herein is the direction in which each gear and each shaft of the electric motorcycle 1 rotates when the electric motorcycle 1 powered by the electric motor 20 moves forward. Hereinafter, the rotational direction opposite to the "normal direction" is referred to as the "reverse direction".

The drivetrain 30 includes a rotary member 34 on the driven shaft 3B. The rotary member 34 can be engaged with a neutral clutch member 51 to be described later. The one-way clutch 46 is located outside the rotary member 34 in the radial direction and inside the first driven gear 41B in the radial direction. The inner race of the one-way clutch 46 rotates together with the rotary member 34, and the outer race of the one-way clutch 46 rotates together with the first driven gear 41B.

The location of the one-way clutch 46 is not limited to the above example. For example, the one-way clutch 46 may be mounted on the drive shaft 3A and located between the drive shaft 3A and the first drive gear 41A in the radial direction of the drive shaft 3A. The rotary member 34 need not be mounted on the driven shaft 3B. In this case, the one-way clutch 46 may be fitted on the outside of the driven shaft 3B so that the inner race of the one-way clutch 46 rotates together with the driven shaft 3B.

Path Operation During Deceleration

In contrast to the one-way clutch 46, a path with a smaller speed ratio than the first speed path T1 includes a one-way clutch that prevents power (the drive power of the electric motor 20) to be transmitted from the drive shaft 3A to the driven shaft 3B, but allows power (the rotation of the rear wheel 6) to be transmitted from the driven shaft 3B to the drive shaft 3A. As shown in FIG. 2B, the drivetrain 30 includes the one-way clutch 48 in the third speed path T3. The one-way clutch 48 prevents power transmission from the drive shaft 3A to the driven shaft 3B, but allows power transmission from the driven shaft 3B to the drive shaft 3A. That is, the one-way clutch 48 does not transmit the power of the electric motor 20 from the drive shaft 3A to the driven shaft 3B, whereas it transmits the rotation of the rear wheel 6 from the driven shaft 3B to the drive shaft 3A.

In the drivetrain 30, the one-way clutch 48 is mounted on the drive shaft 3A and located between the drive shaft 3A and the third drive gear 43A in the radial direction of the drive shaft 3A. When the drive shaft 3A rotates in the normal direction relative to the third drive gear 43A (i.e., when the drive shaft 3A rotates in the normal direction faster than the third drive gear 43A), the one-way clutch 48 does not transmit the rotation of the drive shaft 3A (the drive power of the electric motor 20) to the third drive gear 43A. On the other hand, when the third drive gear 43A rotates in the normal direction relative to the drive shaft 3A (i.e., when the third drive gear 43A rotates in the normal direction faster than the drive shaft 3A), the one-way clutch 48 transmits the rotation of the third drive gear 43A (the rotation of the rear wheel 6) to the drive shaft 3A. The one-way clutch 48 is located outside the drive shaft 3A in the radial direction of the shaft and inside the third drive gear 43A in the same direction. The inner race of the one-way clutch 48 rotates together with the drive shaft 3A, and the outer race of the one-way clutch 48 rotates together with the third drive gear 43A.

The location of the one-way clutch 48 is not limited to the above example. For example, the one-way clutch 48 may be mounted on the driven shaft 3B and located between the third driven gear 43B and the driven shaft 3B in the radial direction of the driven shaft 3B.

Figure 3A:
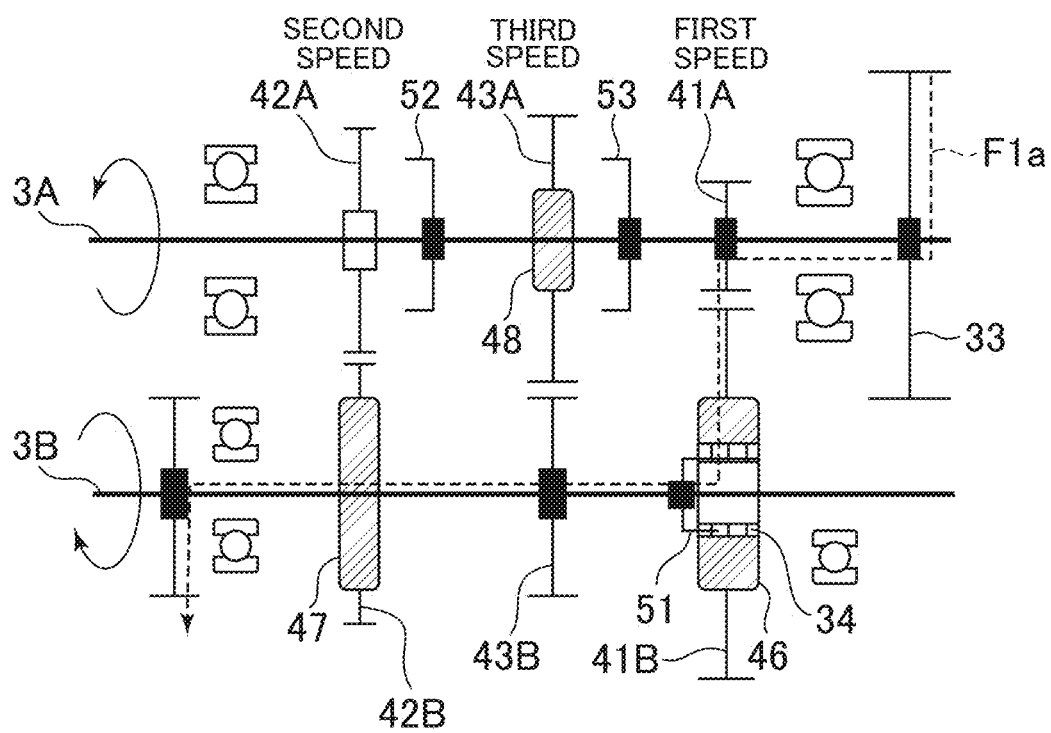
FIG. 3A is a diagram showing how power is transmitted during acceleration when the first speed path is being used.
Figure 3B:
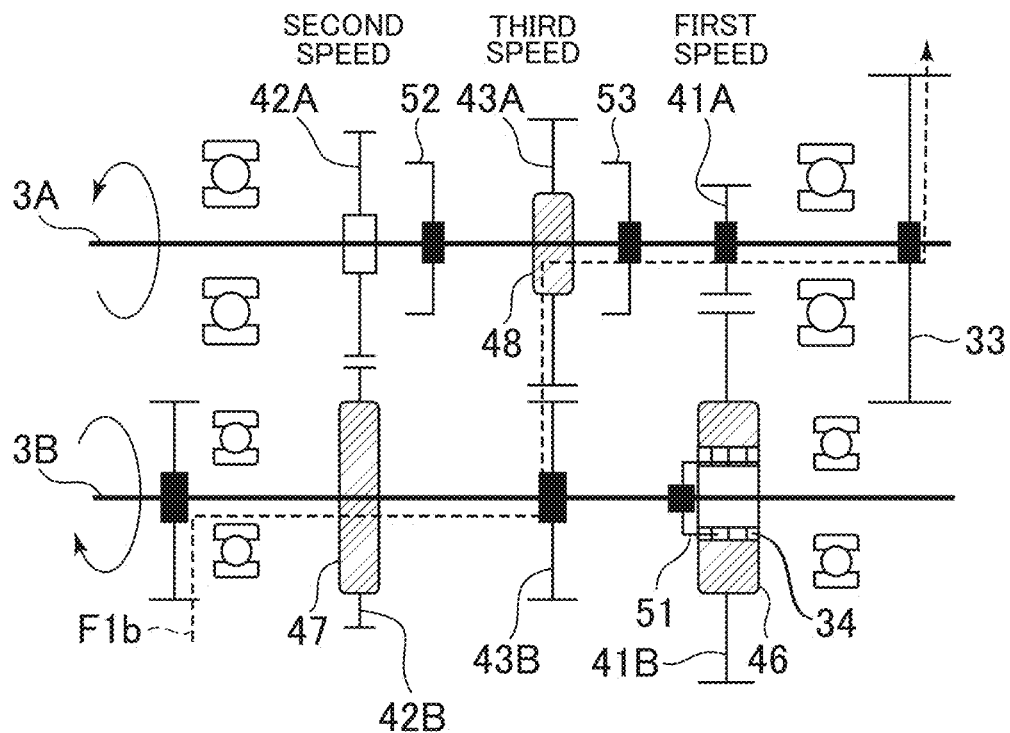
FIG. 3B is a diagram showing how power is transmitted during deceleration when the first speed path is being used.

FIG. 3A shows how power is transmitted during acceleration when the first speed path T1 is being used. FIG. 3B shows how power is transmitted during deceleration when the first speed path T1 is being used. When the first speed path T1 is selected, the neutral clutch member 51 to be described later is engaged with the rotary member 34 so that power can be transmitted between the first driven gear 41B and the driven shaft 3B. Also, when the first speed path T1 is selected, a shift clutch member 52 of the second speed path T2 and a shift clutch member 53 of the third speed path T3, which will be described later, are placed at their disconnection positions where the shift clutch members 52 and 53 are not engaged with the drive gears 42A and 43A respectively.

During acceleration, the first driven gear 41B rotates in the normal direction faster than the driven shaft 3B, and the drive shaft 3A rotates in the normal direction faster than the third drive gear 43A. Thus, as shown in FIG. 3A, the power F1a of the electric motor 20 is transmitted to the rear wheel 6 through the first speed path T1. On the other hand, during deceleration (while regenerative control is being performed), the driven shaft 3B rotates in the normal direction faster than the first driven gear 41B. Thus, rotation transmission through the first speed path T1 is blocked by the one-way clutch 46. During deceleration, the third drive gear 43A rotates in the normal direction faster than the drive shaft 3A. Thus, as shown in FIG. 3B, the rotation (power F1b) of the rear wheel 6 is transmitted from the driven shaft 3B to the drive shaft 3A through the one-way clutch 48 of the third speed path T3.

Neutral Clutch

The drivetrain 30 includes a neutral clutch. The neutral clutch prevents rotation transmission through the first speed path T1 when the rear wheel 6 rotates in the reverse direction. The neutral clutch of the drivetrain 30 is formed by a combination of the above rotary member 34 and the neutral clutch member 51.

As shown in FIG. 2B, the rotary member 34 having an annular shape is fitted on the outside of the driven shaft 3B and located inside the one-way clutch 46 in the radial direction. The rotary member 34 is not engaged with the driven shaft 3B and is rotatable both in the normal and reverse directions relative to the driven shaft 3B. For example, a plain bearing 39 is provided between the inner surface of the rotary member 34 and the outer surface of the driven shaft 3B. This rotary member 34 allows the first driven gear 41B to rotate both in the normal and reverse directions relative to the driven shaft 3B.

The neutral clutch member 51 is mounted on the driven shaft 3B and rotates together with the driven shaft 3B. The neutral clutch member 51 is engaged with the driven shaft 3B, for example, by a spline 3b formed on the driven shaft 3B, and thus rotates together with the driven shaft 3B. As shown in FIG. 2B, the neutral clutch member 51 may be formed integrally with the third driven gear 43B of the third speed path T3. That is, the neutral clutch member 51 and the third driven gear 43B may constitute a single metal part. The neutral clutch member 51 is movable, axially along the driven shaft 3B, between its connection and disconnection positions relative to the rotary member 34 and the first driven gear 41B. The neutral clutch member 51 at the connection position connects the first driven gear 41B and the driven shaft 3B so that they rotate together. Specifically, the neutral clutch member 51 placed at the connection position is engaged with the rotary member 34 and rotates together with the rotary member 34. Consequently, during acceleration of the vehicle (i.e., when the one-way clutch 46 transmits power), the first driven gear 41B and the driven shaft 3B rotate together. On the other hand, the neutral clutch member 51 at the disconnection position is apart and disengaged from the rotary member 34. Consequently, the first driven gear 41B is disconnected from the driven shaft 3B. As described above, the rotary member 34 is rotatable relative to the driven shaft 3B. Thus, if the first driven gear 41B is disconnected from the driven shaft 3B, the first speed path T1 does not transmit rotation.

As shown in FIG. 2B, in the drivetrain 30, the neutral clutch member 51 has an interlock projection 51a projecting axially toward the rotary member 34. The rotary member 34 has an interlock projection 34a projecting toward the neutral clutch member 51. When the neutral clutch member 51 is at the connection position, the interlock projection 34a and the interlock projection 51a engage with each other. In contrast to the above example, either the neutral clutch member 51 or the rotary member 34 may have an interlock projection, and the other may have an interlock recess into which the interlock projection can be fitted.

As shown in FIG. 2B, there is a recess 51b formed between the neutral clutch member 51 and the third driven gear 43B. The recess 51b is adapted to catch an actuator (e.g., a shift fork) for moving the neutral clutch member 51 and the third driven gear 43B axially along the driven shaft 3B. The actuator may be controlled by the controller of the vehicle or manually moved by the vehicle operator. Alternatively, instead of the neutral clutch member 51, the rotary member 34 may be axially moved by the actuator.

If the neutral clutch is absent, both the one-way clutch 46 of the first speed path T1 and the one-way clutch 48 of the third speed path T3 attempt to transmit the rotation of the rear wheel 6 to the drive shaft 3A when the electric motorcycle 1 is backed up. That is, the inner and outer races of the one-way clutch 46 attempt to rotate together, and the inner and outer races of the one-way clutch 48 attempt to rotate together. The speed ratio of the first speed path T1 is greater than the speed ratio of the third speed path T3. Thus, the speed of rotation that the first speed path T1 attempts to transmit to the drive shaft 3A is different from the speed of rotation that the third speed path T3 attempts to transmit to the drive shaft 3A. Consequently, the gears 41A and 41B of the first speed path T1 and the gears 43A and 43B of the third speed path T3 fail to rotate. In contrast, the electric motorcycle 1 can be backed up by its user, because the first speed path T1 does not transmit the rotation of the rear wheel 6 to the drive shaft 3A when the neutral clutch member 51 is placed at the disconnection position.

The neutral clutch is not limited to the above example. For example, a structure in which the one-way clutch 46 of the first speed path T1 is mounted on the drive shaft 3A can eliminate the need for the rotary member 34 mounted on the driven shaft 3B. In this case, a plain bearing may be mounted inside the first driven gear 41B so that the first driven gear 41B is rotatable both in the normal and reverse directions relative to the driven shaft 3B. The neutral clutch member 51 at the connection position may be engaged with the first driven gear 41B to connect the first driven gear 41B and the driven shaft 3B so that they rotate together. The neutral clutch member 51 at the disconnection position may be apart and disengaged from the first driven gear 41B. In still another example, the neutral clutch member 51 may be formed separately from the third driven gear 43B.

The drivetrain 30 need not necessarily include a neutral clutch. That is, the drivetrain 30 need not include either the neutral clutch member 51 or the rotary member 34. In this case, the one-way clutch 46 may be located outside the driven shaft 3B and inside the first driven gear 41B in the radial direction so that the inner race of the one-way clutch 46 rotates together with the driven shaft 3B and that the outer race of the driven shaft 3B rotates together with the first driven gear 41B.

Second Path

As described above, the drivetrain 30 has the second speed path T2 whose speed ratio is between the speed ratio of the first speed path T1 and the speed ratio of the third speed path T3. As shown in FIG. 2B, the second speed path T2 includes the one-way clutch 47. The one-way clutch 47 allows power (the drive power from the electric motor 20) to be transmitted from the drive shaft 3A to the driven shaft 3B, but prevents power (the rotation of the rear wheel 6) to be transmitted from the driven shaft 3B to the drive shaft 3A in the same manner as the one-way clutch 46 of the first speed path T1. In the drivetrain 30, the one-way clutch 47 is mounted on the driven shaft 3B and located between the driven shaft 3B and the second driven gear 42B. When the second driven gear 42B rotates in the normal direction relative to the driven shaft 3B (i.e., when the second driven gear 42B rotates in the normal direction faster than the driven shaft 3B), the one-way clutch 47 transmits the rotation of the second driven gear 42B (the power of the electric motor 20) to the driven shaft 3B. On the other hand, when the driven shaft 3B rotates in the normal direction relative to the second driven gear 42B (i.e., when the driven shaft 3B rotates in the normal direction faster than the second driven gear 42B), the one-way clutch 47 does not transmit the rotation of the driven shaft 3B (the rotation of the rear wheel 6) to the second driven gear 42B.

The drivetrain 30 includes a rotary member 35 on the driven shaft 3B. The rotary member 35 is engaged with the spline 3b formed on the driven shaft 3B so as to rotate together with the driven shaft 3B both in the normal and reverse directions. The one-way clutch 47 is located outside the rotary member 35 and inside the second driven gear 42B in the radial direction. The inner race of the one-way clutch 47 rotates together with the rotary member 35, and the outer race of the one-way clutch 47 rotates together with the second driven gear 42B.

The structure of the second speed path T2 is not limited to the above example. For example, the rotary member 35 need not be mounted on the driven shaft 3B. In this case, the inner race of the one-way clutch 47 may be in contact with the outer surface of the driven shaft 3B, and the outer race of the one-way clutch 47 may be in contact with the inner surface of the second driven gear 42B. In still another example, the one-way clutch 47 may be mounted on the drive shaft 3A and located between the drive shaft 3A and the second drive gear 42A in the radial direction.

Transmission Mechanism for Second Speed

The drivetrain 30 is provided with a transmission mechanism for allowing or preventing the second speed path T2 to transmit power (the drive power of the electric motor 20) from the drive shaft 3A to the driven shaft 3B. The second speed path T2 includes the shift clutch member 52 as the transmission mechanism. The shift clutch member 52 is mounted on the drive shaft 3A so as to be rotatable together with the drive shaft 3A. The shift clutch member 52 is movable axially along the drive shaft 3A relative to the second drive gear 42A. On the other hand, the second drive gear 42A is rotatable both in the normal and reverse directions relative to the drive shaft 3A. The shift clutch member 52 is movable axially between its connection and disconnection positions. The shift clutch member 52 at the connection position connects the drive shaft 3A and the second drive gear 42A so that they rotate together. Thus, when the shift clutch member 52 is at the connection position, the rotation of the drive shaft 3A (the power of the electric motor 20) is transmitted to the second drive gear 42A. On the other hand, the shift clutch member 52 at the disconnection position is apart from the second drive gear 42A so as to disconnect the drive shaft 3A and the second drive gear 42A.

The drivetrain 30 includes a spline 3a formed on the drive shaft 3A. The shift clutch member 52 is engaged with the spline 3a. This allows the shift clutch member 52 to rotate together with the drive shaft 3A both in the normal and reverse directions and also to move axially along the drive shaft 3A relative to the second drive gear 42A.

The shift clutch member 52 and the second drive gear 42A respectively, have an interlock projection and an interlock recess that are engageable with each other. In the drivetrain 30, as shown in FIG. 2B, the shift clutch member 52 has an interlock projection 52a projecting axially toward the second drive gear 42A, and the second drive gear 42A has an interlock recess 42a into which the interlock projection 52a can be fitted. When the shift clutch member 52 is at the connection position, the interlock projection 52a is fitted in the interlock recess 42a to engage the shift clutch member 52 with the second drive gear 42A so that they rotate together.

As shown in FIG. 2B, the shift clutch member 52 has a recess 52b. The recess 52b is adapted to catch an actuator (e.g., a shift fork) for moving the shift clutch member 52 axially along the drive shaft 3A. The actuator may be controlled by the controller of the vehicle or manually moved by the vehicle operator. Alternatively, instead of the shift clutch member 52, the second drive gear 42A may be axially moved by the actuator.

Figure 4A:
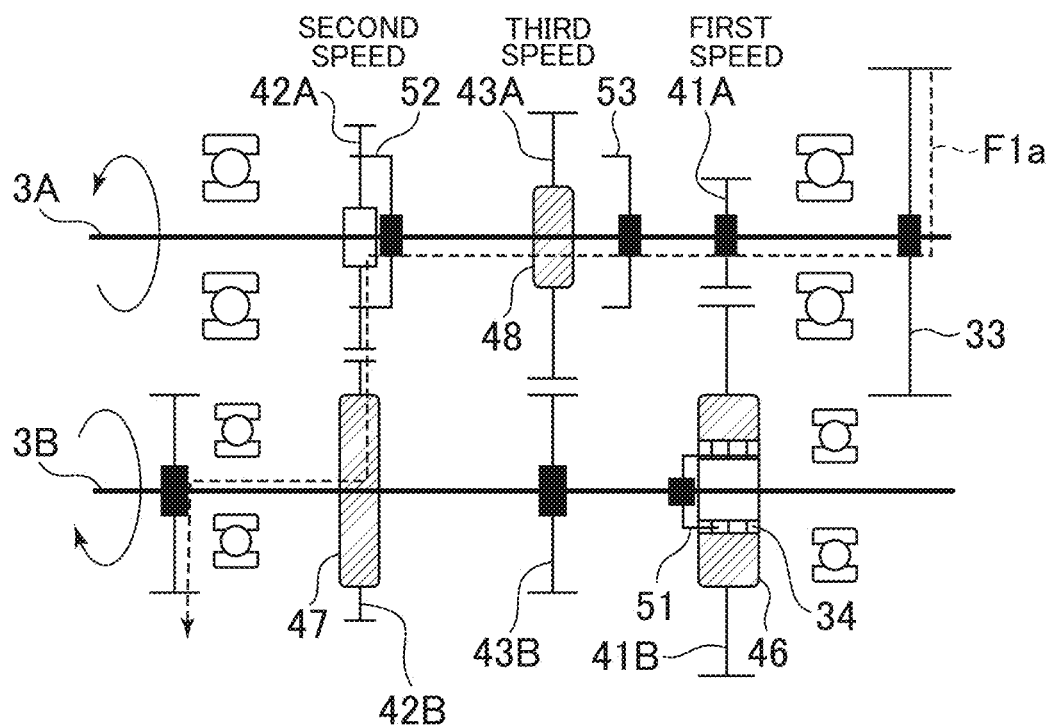
FIG. 4A is a diagram showing how power is transmitted during acceleration when the second speed path is being used.
Figure 4B:
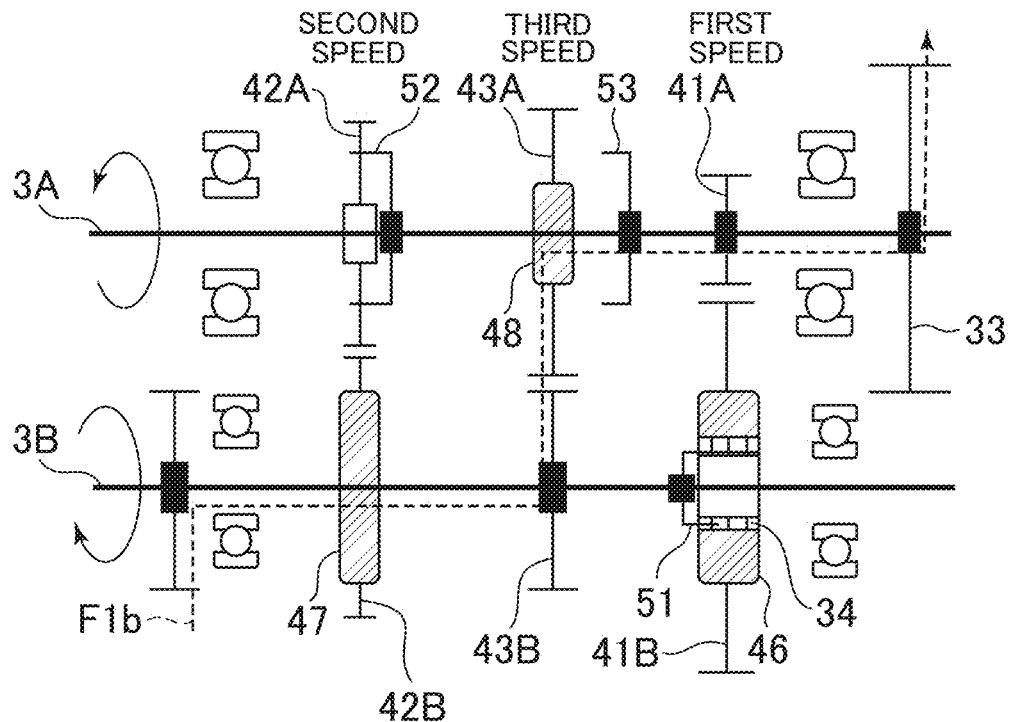
FIG. 4B is a diagram showing how power is transmitted during deceleration when the second speed path is being used.

FIG. 4A shows how power is transmitted during acceleration when the second speed path T2 is being used. FIG. 4B shows how power is transmitted during deceleration when the second speed path T2 is being used. In the drivetrain 30, when the second speed path T2 is selected, the shift clutch member 52 is placed at the connection position to connect the second drive gear 42A and the drive shaft 3A. Also, the shift clutch member 53 of the third speed path T3, which will be described later, is placed at its disconnection position where the shift clutch member 53 is not engaged with the drive gear 43A. During acceleration, the second driven gear 42B rotates in the normal direction faster than the driven shaft 3B. Thus, as shown in FIG. 4A, the power F1a of the electric motor 20 is transmitted to the rear wheel 6 through the second speed path T2. When the power F1a is transmitted from the drive shaft 3A to the driven shaft 3B through the second speed path T2, the driven shaft 3B rotates in the normal direction faster than the first driven gear 41B even if the neutral clutch member 51 is engaged with the rotary member 34. Consequently, the power is not transmitted through the first speed path T1. During deceleration, the driven shaft 3B rotates in the normal direction faster than the second driven gear 42B. Thus, the workings of the one-way clutch 47 cause the second speed path T2 not to transmit the power F1b during deceleration. In the same manner as when the first speed path T1 is being used, the third drive gear 43A rotates in the normal direction faster than the drive shaft 3A during deceleration. Thus, the rotation (power F1b) of the rear wheel 6 is transmitted from the driven shaft 3B to the drive shaft 3A through the third speed path T3.

The transmission mechanism in the second speed path T2 is not limited to the above example. For example, the second driven gear 42B may be mounted so as to be rotatable both in the normal and reverse directions relative to the driven shaft 3B, and the shift clutch member 52 may be mounted on the driven shaft 3B. The shift clutch member 52 at its connection position may connect the driven shaft 3B and the second driven gear 42B so that they rotate together. The shift clutch member 52 at its disconnection position may be apart from the second driven gear 42B so as to disconnect the driven shaft 3B and the second driven gear 42B. In such a structure, the one-way clutch 47 may be mounted on the drive shaft 3A or on the driven shaft 3B.

Transmission Mechanism for Third Speed

As described above, the drivetrain 30 has the third speed path T3 as a path that transmits the rotation of the rear wheel 6 from the driven shaft 3B to the drive shaft 3A. As shown in FIG. 2B, the drivetrain 30 includes the shift clutch member 53 for allowing power (the drive power from the electric motor 20) to be transmitted from the drive shaft 3A to the driven shaft 3B through the third speed path T3. The shift clutch member 53 is mounted on the shaft on which the above one-way clutch 48 is mounted. The shift clutch member 53 in the drivetrain 30 is mounted on the drive shaft 3A and rotates together with the drive shaft 3A. The shift clutch member 53 is movable axially along the drive shaft 3A relative to the third drive gear 43A. The shift clutch member 53 is movable between its connection and disconnection positions. The shift clutch member 53 at the connection position connects the drive shaft 3A and the third drive gear 43A so that they rotate together. Thus, when the shift clutch member 53 is at the connection position, the rotation of the drive shaft 3A (the power of the electric motor 20) is transmitted to the third drive gear 43A through the shift clutch member 53. On the other hand, the shift clutch member 53 at the disconnection position is apart from the third drive gear 43A so as to disconnect the drive shaft 3A and the third drive gear 43A. The third speed path T3 includes the one-way clutch 48. Thus, when the shift clutch member 53 is at the disconnection position, the third speed path T3 does not transmit the rotation of the drive shaft 3A (the power of the electric motor 20) to the driven shaft 3B.

The drivetrain 30 includes a spline 3c formed on the drive shaft 3A. The shift clutch member 53 is engaged with the spline 3c. This allows the shift clutch member 53 to rotate together with the drive shaft 3A both in the normal and reverse directions and also to move axially along the drive shaft 3A relative to the third drive gear 43A.

The shift clutch member 53 and the third drive gear 43A respectively have an interlock projection and an interlock recess that are engageable with each other. In the drivetrain 30, as shown in FIG. 2B, the shift clutch member 53 has an interlock projection 53a projecting axially toward the third drive gear 43A. The third drive gear 43A has an interlock recess 43a into which the interlock projection 53a can be fitted. When the shift clutch member 53 is at the connection position, the interlock projection 53a is fitted in the interlock recess 43a to engage the shift clutch member 53 with the third drive gear 43A.

As shown in FIG. 2B, the shift clutch member 53 has a recess 53b formed therein. The recess 53b is adapted to catch an actuator (e.g., a shift fork) for moving the shift clutch member 53 axially along the drive shaft 3A. The actuator may be controlled by the controller of the vehicle or manually moved by the vehicle operator. Alternatively, instead of the shift clutch member 53, the third drive gear 43A may be axially moved by the actuator.

Figure 5A:
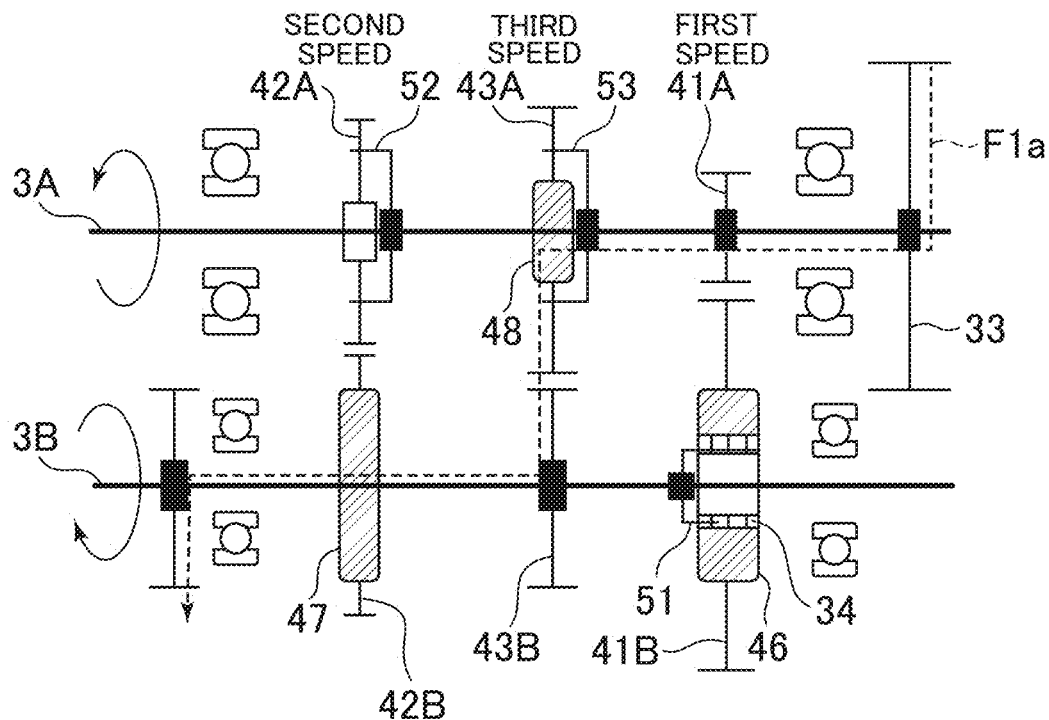
FIG. 5A is a diagram showing how power is transmitted during acceleration when the third speed path is being used.
Figure 5B:
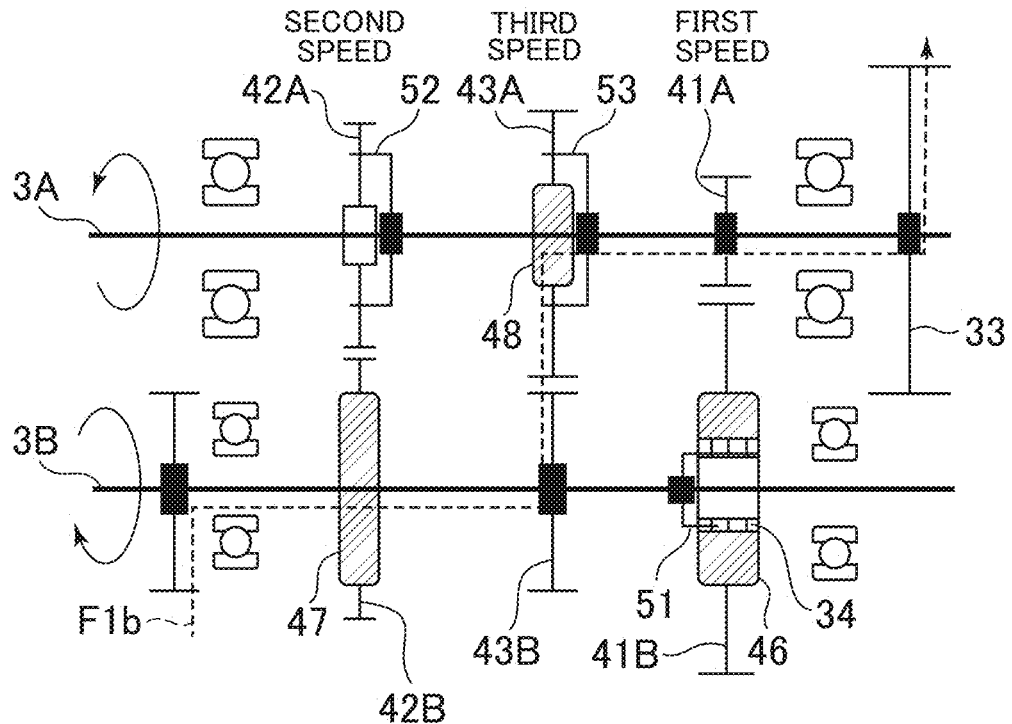
FIG. 5B is a diagram showing how power is transmitted during deceleration when the third speed path is being used.

FIG. 5A shows how power is transmitted during acceleration when the third speed path T3 is being used. FIG. 5B shows how power is transmitted during deceleration when the third speed path T3 is being used. When the third speed path T3 is selected, the shift clutch member 53 is placed at the connection position and engaged with the third drive gear 43A to connect the third drive gear 43A and the drive shaft 3A. With this connection, the shift clutch member 53 allows for both power transmission from the drive shaft 3A to the third drive gear 43A and power transmission from the third drive gear 43A to the drive shaft 3A. Consequently, as shown in FIG. 5A, the power F1a of the electric motor 20 is transmitted to the rear wheel 6 through the third speed path T3 during acceleration. During deceleration, the rotation (power F1b) of the rear wheel 6 is transmitted from the driven shaft 3B to the drive shaft 3A through the third speed path T3. As described above, the first speed path T1 and the second speed path T2 respectively include the one-way clutches 46 and 47, and thus do not transmit the rotation of the rear wheel 6 to the drive shaft 3A.

When the power F1a is transmitted from the drive shaft 3A to the driven shaft 3B through the third speed path T3, the driven shaft 3B rotates in the normal direction faster than the first driven gear 41B even if the neutral clutch member 51 is at its connection position. Consequently, the power is not transmitted through the first speed path T1. As shown in FIG. 5A, when the third speed path T3 is selected, the shift clutch member 52 of the second speed path T2 may be placed at its connection position and engaged with the second drive gear 42A. When the third speed path T3 is being used, the driven shaft 3B rotates in the normal direction faster than the second driven gear 42B even if the shift clutch member 52 is at the connection position. Consequently, the power is not transmitted through the second speed path T2.

The arrangement of the one-way clutch 48 and the shift clutch member 53 is not limited to the above example. For example, the one-way clutch 48 may be mounted on the driven shaft 3B and located between the driven shaft 3B and the third driven gear 43B in the radial direction of the driven shaft 3B. The shift clutch member 53 may also be mounted on the driven shaft 3B. In this case, the shift clutch member 53 at its connection position connects the driven shaft 3B and the third driven gear 43B so that they rotate together, and the shift clutch member 53 at the disconnection position is apart from the third driven gear 43B so as to disconnect the driven shaft 3B and the third driven gear 43B.

Layout of One-Way Clutches and Other Parts

The following describes in detail the locational relationship between the one-way clutches, the shift clutch members, the neutral clutch member, and other parts of the drivetrain 30.

As shown in FIG. 2B, the one-way clutch 46 of the first speed path T1 is located inside the larger-diameter of the two gears 41A and 41B, which are included in the first speed path T1. That is, the one-way clutch 46 is located inside the first driven gear 41B. This makes it easier to locate the one-way clutch 46.

As described above, the drivetrain 30 includes the rotary member 34 forming a neutral clutch. The rotary member 34 is also located inside the larger-diameter of the two gears 41A and 41B, which are included in the first speed path T1. That is, the rotary member 34 is located inside the first driven gear 41B in the radial direction, together with the one-way clutch 46. In contrast to the above example, the one-way clutch 46 of the first speed path T1 may be mounted on the shaft opposite the neutral clutch (specifically, the neutral clutch member 51). In this case, the rotary member 34 need not be mounted on the driven shaft 3B.

As shown in FIG. 2B, the one-way clutch 47 of the second speed path T2 is located inside the larger-diameter of the two gears 42A and 42B, which are included in the second speed path T2. That is, the one-way clutch 47 is located inside the second driven gear 42B.

As shown in FIG. 2B, in the drivetrain 30, the third speed path T3 is next to the first speed path T1. That is, the three paths T1, T2, and T3 are arranged in the order of the first speed path T1, the third speed path T3, and the second speed path T2. The one-way clutch 48 of the third speed path T3 is mounted on the shaft opposite the one-way clutch 46 of the first speed path T1. Specifically, the one-way clutch 46 is mounted on the driven shaft 3B and located inside the first driven gear 41B in the radial direction of the driven shaft 3B. In contrast, the one-way clutch 48 is mounted on the drive shaft 3A and located inside the third drive gear 43A in the radial direction of the drive shaft 3A. The one-way clutches 46 and 48 thus laid out, facilitate reduction in the width of the drivetrain 30 (the lengths of the shafts 3A and 3B). In direct contrast to the above example, the one-way clutch 46 of the first speed path T1 may be mounted on the drive shaft 3A, and the one-way clutch 48 of the third speed path T3 may be mounted on the driven shaft 3B. This layout also makes it relatively easy to reduce the width of the drivetrain 30 (the lengths of the shafts 3A and 3B).

As described above, the shift clutch member 53 of the third speed path T3 is mounted on the same shaft as the one-way clutch 48 of the third speed path T3. Thus, the shift clutch member 53 and the one-way clutch 48 are mounted on the shaft opposite the one-way clutch 46 of the first speed path T1 (i.e., on the drive shaft 3A). The shift clutch member 53 is located between the third drive gear 43A and the first drive gear 41A in the axial direction. In contrast to the above example, the shift clutch member 53 may be located across the third drive gear 43A from the first drive gear 41A.

The one-way clutch 47 of the second speed path T2 is mounted on the shaft opposite the one-way clutch 48 of the third speed path T3. In the drivetrain 30, as shown in FIG. 2B, the one-way clutch 47 is mounted on the driven shaft 3B and located inside the second driven gear 42B. On the other hand, the one-way clutch 48 is mounted on the drive shaft 3A, as described above. The one-way clutches 47 and 48 thus laid out facilitate a reduction in the width of the drivetrain 30 (reduction in the lengths of the shafts 3A and 3B). In direct contrast to the above example, the one-way clutch 47 of the second speed path T2 may be mounted on the drive shaft 3A, and the one-way clutch 48 of the third speed path T3 may be mounted on the driven shaft 3B. This layout also facilitates a reduction in the width of the drivetrain 30.

As described above, the one-way clutch 46 of the first speed path T1 is mounted on the shaft opposite the one-way clutch 48 of the third speed path T3. Thus, in the drivetrain 30, the one-way clutch 46 of the first speed path T1 and the one-way clutch 47 of the second speed path T2 are mounted on the same shaft (specifically, the driven shaft 3B), and the one-way clutch 48 of the third speed path T3 is mounted on the opposite shaft (specifically, the drive shaft 3A). That is, the one-way clutches 46 and 47 of the outer two paths (the first speed path T1 and the second speed path T2), among three paths T1, T2, and T3, are mounted on the same shaft, and the one-way clutch 48 of the middle path (the third speed path T3) is mounted on the opposite shaft. The one-way clutches 46, 47, and 48 thus arranged, facilitate a reduction in the width of the drivetrain 30.

The arrangement of the paths T1, T2, and T3 and the arrangement of the one-way clutches are not limited to the above example. For example, the one-way clutch 46 of the first speed path T1 and the one-way clutch 47 of the second speed path T2 may be mounted on the drive shaft 3A, and the one-way clutch 48 of the third speed path T3 may be mounted on the driven shaft 3B. In still another example, the three paths may be arranged in the order of the first speed path T1, the second speed path T2, and the third speed path T3. In this case, the one-way clutch 46 of the first speed path T1 and the one-way clutch 48 of the third speed path T3 may be mounted on the same shaft, and the one-way clutch 47 of the second speed path T2 may be mounted on the opposite shaft. In still another example, the three paths may be arranged in the order of the third speed path T3, the first speed path T1, and the second speed path T2. In this case, the one-way clutch 48 of the third speed path T3 and the one-way clutch 47 of the second speed path T2 may be mounted on the same shaft, and the one-way clutch 46 of the first speed path T1 may be mounted on the opposite shaft.

As shown in FIG. 2B, the shift clutch member 52 of the second speed path T2 is mounted on the shaft opposite the one-way clutch 47 of the second speed path T2. In the drivetrain 30, the shift clutch member 52 is mounted on the drive shaft 3A, and the one-way clutch 47 is mounted on the driven shaft 3B as described above. This arrangement also contributes to the reduction in the width of the drivetrain 30.

As described above, in the drivetrain 30, the third driven gear 43B is formed integrally with the neutral clutch member 51. This structure reduces the number of parts in the drivetrain 30, for example, as compared with the structure in which the third driven gear 43B is formed separately from the neutral clutch member 51.

The neutral clutch member 51 is mounted on the shaft opposite the shift clutch member 53 and the one-way clutch 48 of the third speed path T3. Specifically, the neutral clutch member 51 is mounted on the driven shaft 3B, and the shift clutch member 53 and the one-way clutch 48 are mounted on the drive shaft 3A. This arrangement also contributes to the reduction in the axial width of the drivetrain 30.

In the drivetrain 30, the width of each gear inside which the corresponding one-way clutch is mounted, is narrower than the width of the one-way clutch. "The width of each gear" is the tooth width of the gear, which is measured axially along the drive shaft 3A and the driven shaft 3B. For example, the width of the teeth 42b of the second driven gear 42B is narrower than the width of the one-way clutch 47 located inside the second driven gear 42B. In the drivetrain 30, the shift clutch member 52 is located in a space obtained by making the width of the teeth 42b narrower than that of the one-way clutch 47. This reduces the width of the drivetrain 30. The width of the teeth of the first driven gear 41B is also narrower than the width of the one-way clutch 46 located inside the first driven gear 41B. The width of the teeth of the third drive gear 43A is also narrower than the width of the one-way clutch 48 located inside the third drive gear 43A.

Modification 1

Figure 6A:
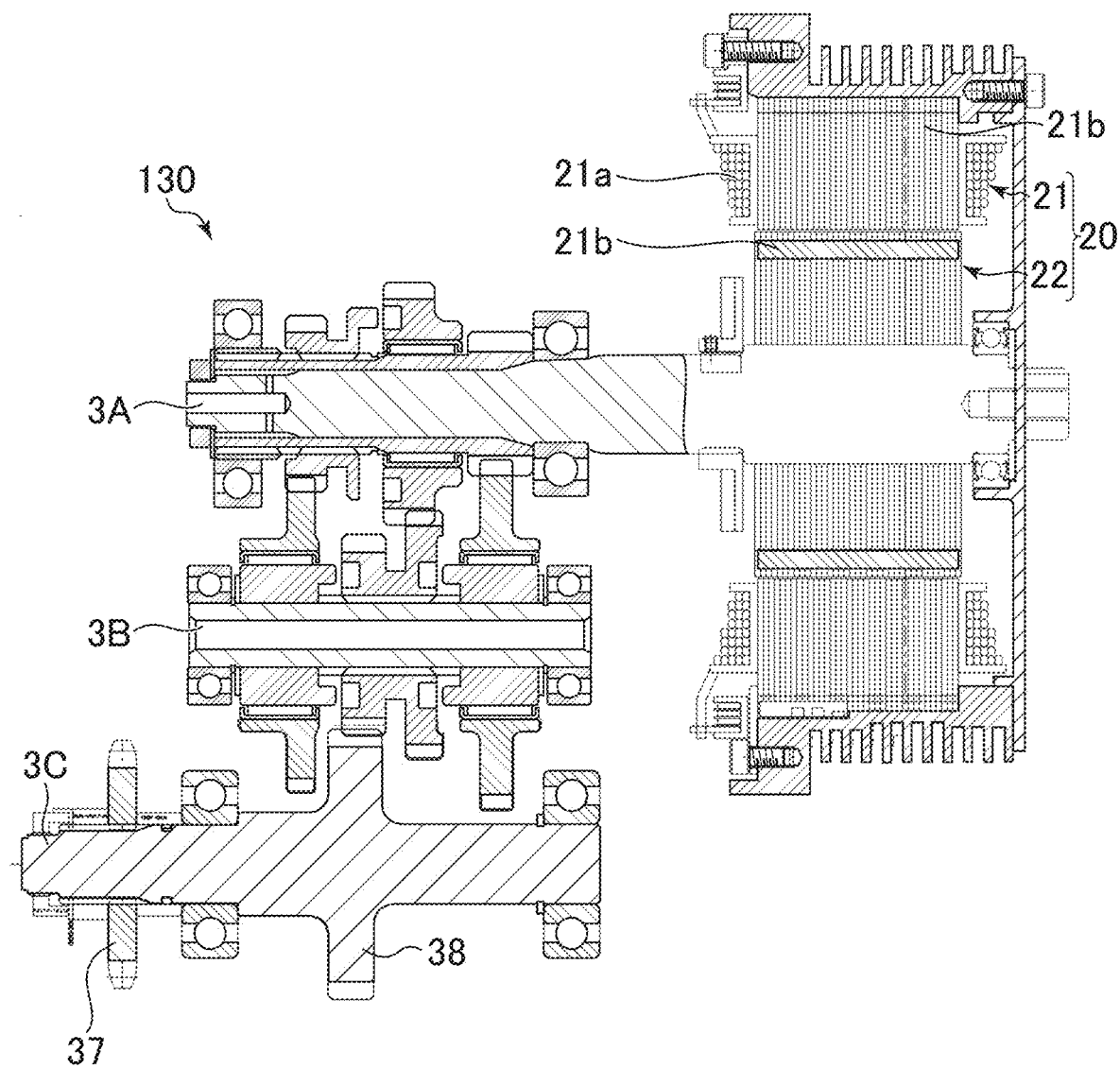
FIG. 6A is a diagram showing a modification of the drivetrain.
Figure 6B:
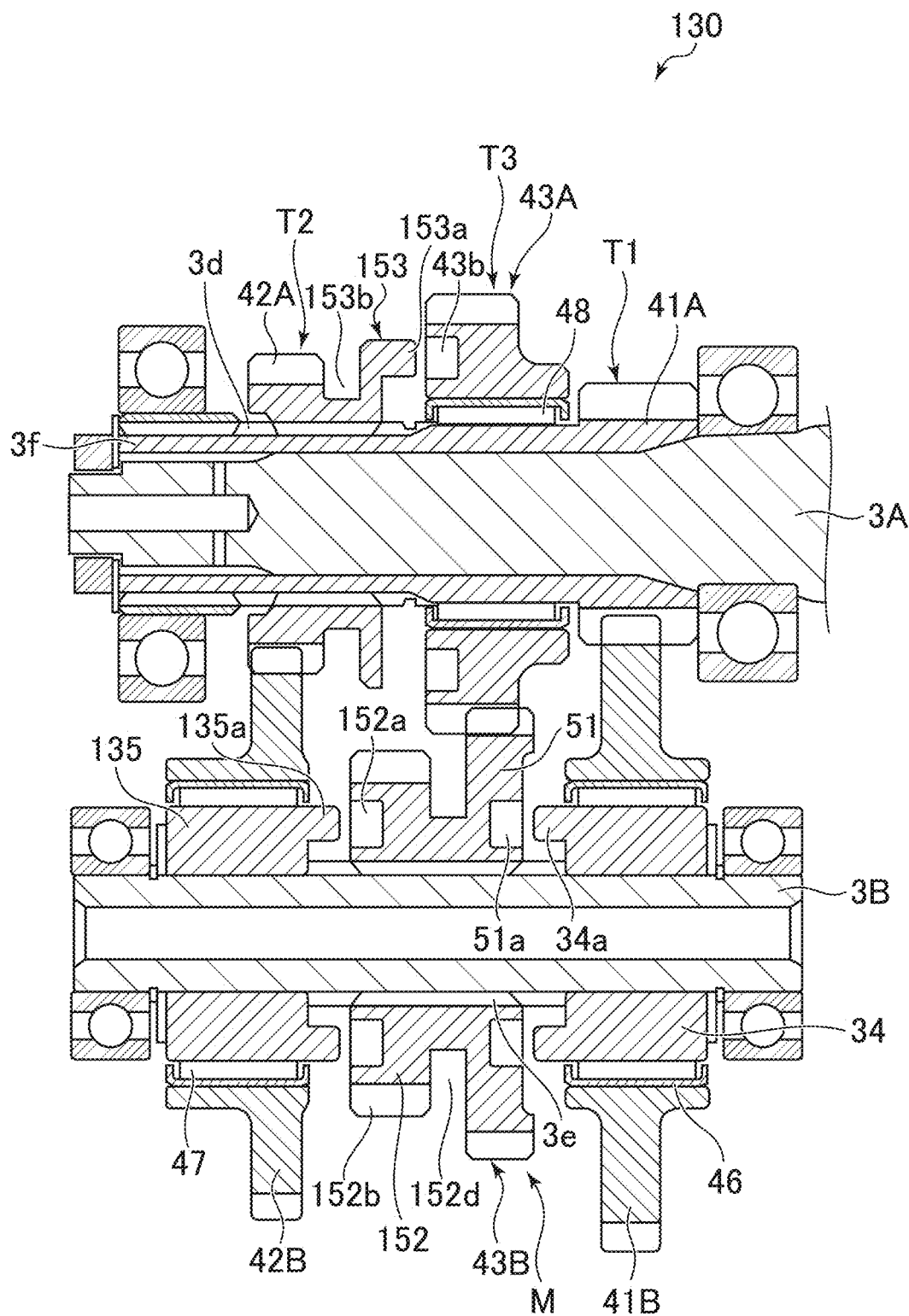
FIG. 6B is a partial enlarged view of FIG. 6A.

FIG. 6A is a cross-sectional view of a drivetrain 130 that is a modification of the drivetrain 30. FIG. 6B is a partial enlarged view of FIG. 6A. The following focuses on differences between the drivetrains 30 and 130, and the common features are not described again herein. In FIGS. 6A and 6B, the parts that the drivetrains 30 and 130 have in common are given the same reference characters. The drivetrain 130 differs from the above-described drivetrain 30 mainly in the layout of its shift clutch members.

As shown in FIG. 6B, the drivetrain 130 has the three power transmission paths T1, T2, and T3, as with the drivetrain 30. The three paths T1, T2, and T3 respectively include the first drive gear 41A, the second drive gear 42A, and the third drive gear 43A. The three paths T1, T2, and T3 also respectively include the first driven gear 41B, the second driven gear 42B, and the third driven gear 43B. The drivetrain 130 includes the one-way clutches 46, 47, and 48 respectively located in the paths T1, T2, and T3, as with the drivetrain 30. Thus, as with the drivetrain 30 described with reference to FIGS. 3A to 5B, the workings of the one-way clutches 46, 47, and 48 always cause the third speed path T3 to transmit the rotation (power F1b) of the rear wheel 6 to the electric motor 20 during deceleration of the vehicle.

As shown in FIG. 6B, in the drivetrain 130, the drive shaft 3A has a cylindrical sleeve 3f on its outside. The sleeve 3f rotates together with the drive shaft 3A. The first drive gear 41A may be formed integrally with the sleeve 3f. The other members mounted on the drive shaft 3A, specifically, the third drive gear 43A, the second drive gear 42A, the one-way clutch 48, and a shift clutch member 153 of the third speed path T3 may be fitted on the outside of the sleeve 3f.

Shift Clutch Member for Second Speed Path

The drivetrain 130 has a transmission mechanism for allowing or preventing the second speed path T2 to transmit power (the power of the electric motor 20) from the drive shaft 3A to the driven shaft 3B. The transmission mechanism is provided by a shift clutch member 152 and a rotary member 135, which are shown in FIG. 6B. The shift clutch member 152 and the rotary member 135 are mounted on the same shaft as the one-way clutch 47 of the second speed path T2. Specifically, the shift clutch member 152 and the rotary member 135 are located on the driven shaft 3B.

The rotary member 135 differs from the rotary member 35 of the drivetrain 30 in that it is rotatable both in the normal and reverse directions relative to the driven shaft 3B. The one-way clutch 47 is located outside the rotary member 135 and inside the second driven gear 42B in the radial direction of the shaft. The inner race of the one-way clutch 47 rotates together with the rotary member 135, and the outer race of the one-way clutch 47 rotates together with the second driven gear 42B.

The shift clutch member 152 is rotatable together with the driven shaft 3B. The shift clutch member 152 is movable axially along the driven shaft 3B relative to the second driven gear 42B and the rotary member 135. The shift clutch member 152 is movable between its connection and disconnection positions. The shift clutch member 152 at the connection position connects the driven shaft 3B and the second driven gear 42B so that they rotate together. Specifically, the shift clutch member 152 at the connection position is engaged with the rotary member 135 and rotates together with the rotary member 135. When the shift clutch member 152 rotates in the normal direction faster than the driven shaft 3B, the rotation of the second driven gear 42B (the drive power from the electric motor 20) is transmitted to the driven shaft 3B through the one-way clutch 47 and the rotary member 135. Consequently, the driven shaft 3B and the second driven gear 42B rotate together. On the other hand, the shift clutch member 152 at the disconnection position is apart and disengaged from the rotary member 135. Consequently, the second driven gear 42B is allowed to rotate both in the normal and reverse directions relative to the driven shaft 3B.

As shown in FIG. 6B, in the drivetrain 130, the shift clutch member 152, the third driven gear 43B, and the neutral clutch member 51 are integrally formed. Hereinafter, a member including these things is referred to as a "movable member M". That is, the shift clutch member 152, the third driven gear 43B, and the neutral clutch member 51 constitute a single metal part. This reduces the number of parts of the drivetrain 130.

The movable member M is located between the first driven gear 41B and the second driven gear 42B, and can move between them axially along the driven shaft 3B. The movable member M is engaged with a spline 3e formed on the driven shaft 3B. This allows the movable member M to rotate together with the driven shaft 3B both in the normal and reverse directions and also to move axially along the driven shaft 3B. When the shift clutch member 152 is at the connection position, the neutral clutch member 51 is placed at the disconnection position and apart from the rotary member 34. On the other hand, when the neutral clutch member 51 is placed at its connection position and engaged with the rotary member 34, the shift clutch member 152 is placed at its disconnection position and apart from the rotary member 34. As shown in FIG. 6B, the movable member M can be placed at a middle position where the shift clutch member 152 is not engaged with the rotary member 135 and the neutral clutch member 51 is not engaged with the rotary member 34. The movable member M has a recess 152d formed therein. The recess 152d is adapted to catch an actuator (e.g., a shift fork) for moving the movable member M axially along the driven shaft 3B. The actuator may be controlled by the controller of the vehicle or manually moved by the vehicle operator.

The shift clutch member 152 and the rotary member 135 have an interlock recess and an interlock projection that are engageable with each other. In the drivetrain 130, as shown in FIG. 6B, the rotary member 135 has an interlock projection 135a projecting axially toward the shift clutch member 152. The shift clutch member 152 has an interlock recess 152a into which the interlock projection 135a can be fitted. When the shift clutch member 152 is at the connection position, the interlock projection 135a is fitted in the interlock recess 152a to engage the shift clutch member 152 with the rotary member 135.

When the second speed path T2 is selected, the shift clutch member 152 is placed at the connection position and engaged with the rotary member 135. Consequently, during acceleration when the second speed path T2 is being used, the power F1a of the electric motor 20 is transmitted to the rear wheel 6 through the second speed path T2, as in the drivetrain 30 shown in FIG. 4A. During deceleration when the second speed path T2 is being used, the workings of the one-way clutches 47 and 48 cause the third speed path T3 to transmit the rotation (power F1b) of the rear wheel 6 from the driven shaft 3B to the drive shaft 3A, as in the drivetrain 30 shown in FIG. 4B.

The transmission mechanism in the second speed path T2 is not limited to the above example. For example, the shift clutch member 152 may be formed separately from the third driven gear 43B (the neutral clutch member 51). The shift clutch member 152 may also be mounted on the drive shaft 3A as with the shift clutch member 52 of the drivetrain 30, and may be movable between the connection position, where it is engaged with the second drive gear 42A, and the disconnection position, where it is apart from the second drive gear 42A.

Connection between Driven Shaft and Axle

As shown in FIG. 6A, the drivetrain 130 includes an output shaft 3C that receives the power of the electric motor 20 from the driven shaft 3B. The output shaft 3C is coupled to the driven shaft 3B through gears. Specifically, the output shaft 3C has a gear 38. As shown in 6B, the movable member M has a gear 152b meshed with the gear 38 of the output shaft 3C. This structure reduces the number of parts of the drivetrain 130 and also reduces the width of the drivetrain 130. In the drivetrain 130, the gear 152b is located in the radial direction of the driven shaft 3B relative to the shift clutch member 152. The structure of the movable member M is not limited to the above example. For example, instead of the gear 152b, the sprocket 37 may be mounted on the driven shaft 3B, as in the drivetrain 30 shown in FIG. 2A.

The output shaft 3C is coupled to the axle of the rear wheel 6 through power transmission members such as a chain, a shaft, a belt, etc. In the example of FIG. 6A, the sprocket 37 is mounted on the output shaft 3C. The sprocket 37 is coupled to the axle of the rear wheel 6 through a chain. In contrast to the above example, a gear (e.g., a bevel gear) engaged with a shaft may be mounted on the output shaft 3C. Alternatively, a pulley on which a belt is to be put may be mounted on the output shaft 3C. As shown in FIG. 6A, in the drivetrain 130, the electric motor 20 is coaxial with the drive shaft 3A. That is, the output shaft of the electric motor 20 functions as the drive shaft 3A. The electric motor 20 may be coupled to the drive shaft 3A through gears, as with the electric motor 20 shown in FIG. 2A.

Shift Clutch Member for Third Speed Path

The third speed path T3 of the drivetrain 130 includes the shift clutch member 153 that allows power (the power of the electric motor 20) to be transmitted from the drive shaft 3A to the driven shaft 3B. The shift clutch member 153 is mounted on the drive shaft 3A. The shift clutch member 153 is movable between its connection and disconnection positions. The shift clutch member 53 at the connection position connects the drive shaft 3A and the third drive gear 43A so that they rotate together. The shift clutch member 153 at the disconnection position is apart from the third drive gear 43A so as to disconnect the drive shaft 3A and the third drive gear 43A. Thus, when the shift clutch member 153 is at the disconnection position, power transmission from the drive shaft 3A to the driven shaft 3B is blocked by the one-way clutch 48.

The shift clutch member 153 is located from the third drive gear 43A toward the second drive gear 42A. The shift clutch member 153 differs from shift clutch member 53 of the drivetrain 30 in that it is formed integrally with the second drive gear 42A. That is, the shift clutch member 153 and the second drive gear 42A constitute a single metal part. This structure reduces the number of parts of the drivetrain 130. The sleeve 3f has a spline 3d formed thereon. The shift clutch member 153 and second drive gear 42A are engaged with the spline 3c. This allows the shift clutch member 153 and the second drive gear 42A to rotate together with the drive shaft 3A both in the normal and reverse directions and also to move axially along the drive shaft 3A relative to the third drive gear 43A. A recess 153b is formed between the shift clutch member 153 and the second drive gear 42A. The recess 153b is adapted to catch an actuator (e.g., a shift fork) for moving the shift clutch member 153 and the second drive gear 42A axially along the drive shaft 3A. The actuator may be controlled by the controller of the vehicle or manually moved by the vehicle operator. In contrast to the above example, the shift clutch member 153 may be formed separately from the second drive gear 42A.

The shift clutch member 153 and the third drive gear 43A have an interlock projection and an interlock recess that are engageable with each other. In the drivetrain 130, as shown in FIG. 6B, the shift clutch member 153 has an interlock projection 153a projecting axially toward the third drive gear 43A. The third drive gear 43A has an interlock recess 43b into which the interlock projection 153a can be fitted.

When the shift clutch member 153 for third speed is at the connection position, the interlock projection 153a is fitted in the interlock recess 43b to engage the shift clutch member 153 with the third drive gear 43A. This allows the shift clutch member 153 and the third drive gear 43A to rotate together.

When the third speed path T3 is selected, the shift clutch member 153 is placed at the connection position to connect the third drive gear 43A and the drive shaft 3A. Consequently, during acceleration when the third speed path T3 is being used, the power F1a of the electric motor 20 is transmitted from the drive shaft 3A to the third drive gear 43A through the shift clutch member 153, as in the drivetrain 30 shown in FIG. 5A. During deceleration, the rotation (power F1b) of the rear wheel 6 is transmitted from the third drive gear 43A to the drive shaft 3A through the shift clutch member 153 (or the one-way clutch 48), as in the drivetrain 30 shown in FIG. 5B.

When the third speed path T3 is selected, the shift clutch member 152 may be placed at its connection position and engaged with the rotary member 135. During acceleration when the third speed path T3 is being used, the driven shaft 3B and the rotary member 135 rotate in the normal direction faster than the second driven gear 42B. Consequently, power is not transmitted through the second speed path T2. When the third speed path T3 is selected, the neutral clutch member 51 may be placed at its connection position and engaged with the rotary member 34. During acceleration when the third speed path T3 is being used, the driven shaft 3B and the rotary member 34 rotate in the normal direction faster than the first driven gear 41B. Consequently, power is not transmitted through the first speed path T1.

Modification 3

Figure 7A:
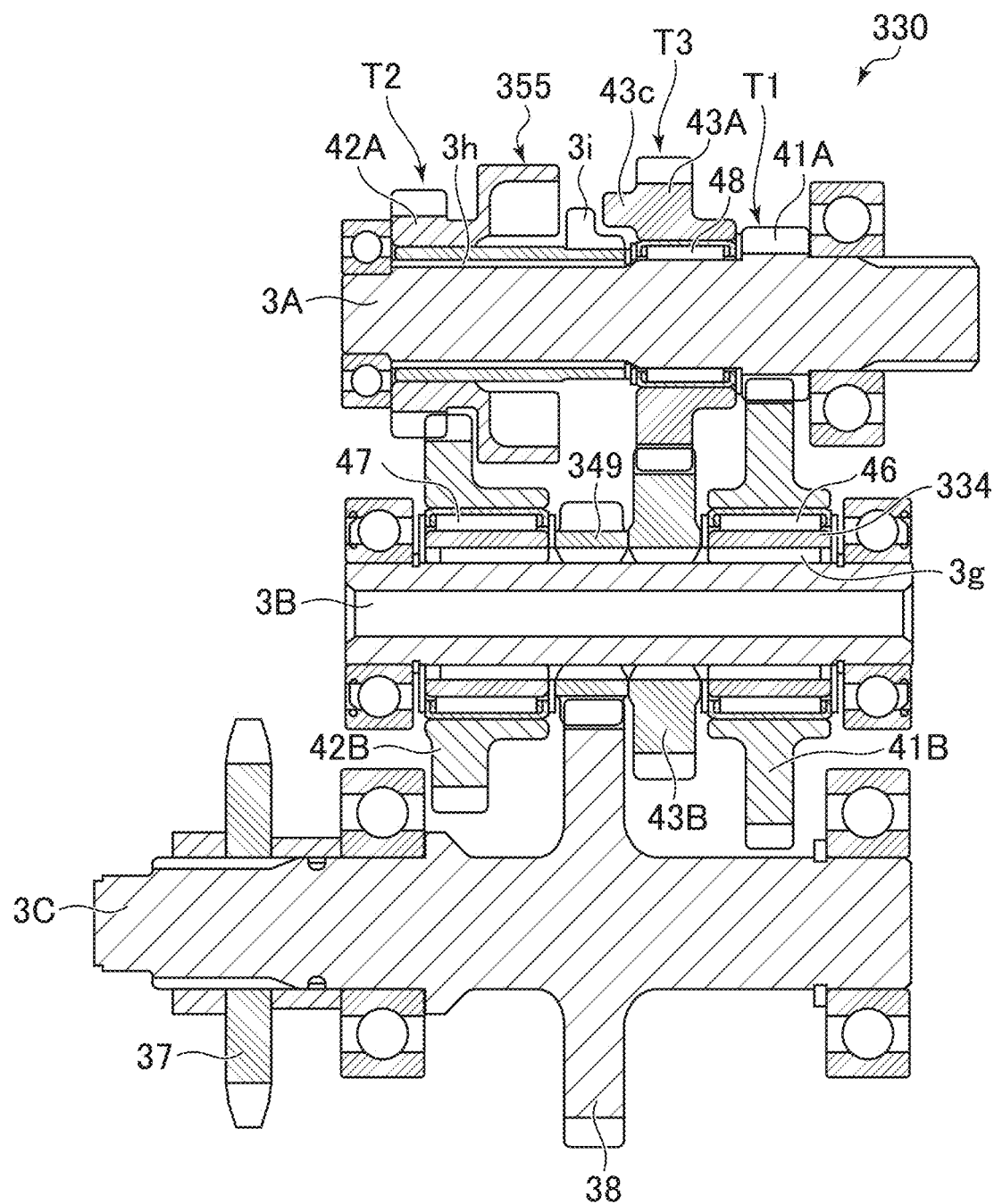
FIG. 7A is a diagram showing another modification of the drivetrain.
Figure 7B:
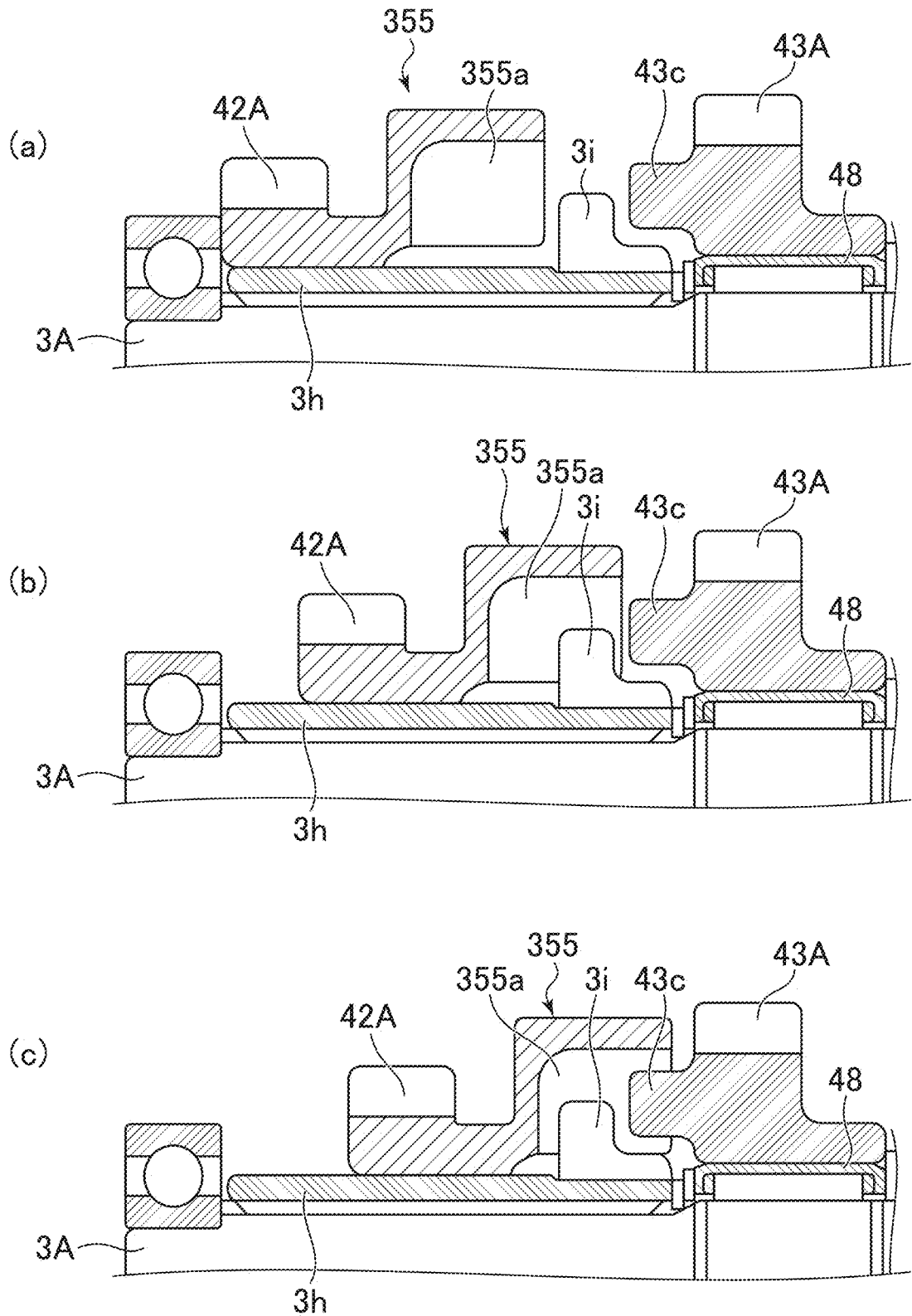
FIG. 7B is a diagram for illustrating how a shift clutch member of the drivetrain shown in FIG. 7A works.

FIG. 7A is a cross-sectional view of a drivetrain 330 that is a modification of the drivetrain 30. FIG. 7B is a diagram for illustrating how a shift clutch member 355 shown in FIG. 7A operates. The following focuses on differences between the drivetrains 30 and 330, and common features are not described again. In FIG. 7A, the parts that the drivetrains 30 and 330 have in common are given the same reference characters. The drivetrain 330 differs from the above-described drivetrain 30 mainly in the structure of its shift clutch members. The drivetrain 330 differs from the drivetrain 30 in that it does not include a neutral clutch.

As shown in FIG. 7A, the drivetrain 330 has the three power transmission paths T1, T2, and T3, as with the drivetrain 30. The three paths T1, T2, and T3 respectively include the first drive gear 41A, the second drive gear 42A, and the third drive gear 43A. The three paths T1, T2, and T3 also respectively include the first driven gear 41B, the second driven gear 42B, and the third driven gear 43B. The drivetrain 330 includes the one-way clutches 46, 47, and 48 respectively located in the paths T1, T2, and T3, as with the drivetrain 30. Thus, as with the drivetrain 30 described with reference to FIGS. 3A to 5B, the workings of the one-way clutches 46, 47, and 48 always cause the third speed path T3 to transmit the rotation (power F1b) of the rear wheel 6 to the electric motor 20 during deceleration of the vehicle.

As shown in FIG. 7A, the drivetrain 330 includes the output shaft 3C, which receives the power of the electric motor 20 from the driven shaft 3B, as with the drivetrain 130 shown in FIG. 6A. The gear 38 on the output shaft 3C meshed with a gear 349 that is mounted on the driven shaft 3B and rotates together with the driven shaft 3B. In the drivetrain 330, the gear 349 is located between the second driven gear 42B and third driven gear 43B. Instead of the gear 349, the sprocket 37 may be mounted on the driven shaft 3B, as in the drivetrain 30 shown in FIG. 2A.

The drivetrain 330 includes a rotary member 334 fitted on the outside of the driven shaft 3B. The one-way clutch 46 of the first speed path T1 is located outside the rotary member 334 and inside the first driven gear 41B. The drivetrain 330 differs from the drivetrain 30, for examples shown in FIG. 2B, in that it does not include a neutral clutch. Thus, the rotary member 334 is engaged with a spline 3g on the outer surface of the driven shaft 3B and rotates together with the driven shaft 3B. The rotary member 334 need not be mounted on the driven shaft 3B.

Shift Clutch Member

The one-way clutch 48 allows power transmission from the third drive gear 43A to the drive shaft 3A, but prevents power transmission from the drive shaft 3A to the third drive gear 43A. As shown in FIG. 7A, the drivetrain 330 includes the shift clutch member 355 that allows for power transmission from the drive shaft 3A to the third drive gear 43A. The shift clutch member 355 is movable axially along the drive shaft 3A. In the drivetrain 330, the shift clutch member 355 can move to a third speed connection position (see FIG. 7B(c)) and a disconnection position (see FIG. 7B(a)). The shift clutch member 355 can also move to a second gear connection position (FIG. 7B(b)) to be described later. The shift clutch member 355 at the third speed connection position connects the drive shaft 3A and the third drive gear 43A so that they rotate together.

As shown in FIG. 7A, the drive shaft 3A has an interlock projection 3i projecting radially from it. In the drivetrain 330, the drive shaft 3A has a sleeve 3h that rotates together with it. The interlock projection 3i is formed on the sleeve 3h. The sleeve 3h and the drive shaft 3A may be integrally formed. That is, the interlock projection 3i may be formed on the drive shaft 3A. The third drive gear 43A has an interlock projection 43c projecting axially toward the shift clutch member 355. The shift clutch member 355 has an interlock recess 355a that is open toward the interlock projections 3i and 43c.

The shift clutch member 355 is rotatable both in the normal and reverse directions relative to the drive shaft 3A. As shown in FIG. 7B(c), when the shift clutch member 355 is placed at the third speed connection position, the interlock projection 3i of the drive shaft 3A and the interlock projection 43c of the third drive gear 43A are located inside the interlock recess 355a. That is, the shift clutch member 355 at the third speed connection position is engaged with both the drive shaft 3A and the third drive gear 43A. Consequently, the third drive gear 43A is coupled to the drive shaft 3A through the shift clutch member 355 and rotates together with the drive shaft 3A. As shown in FIG. 7B(a), when the shift clutch member 355 is placed at the disconnection position, the interlock recess 355a is apart and disengaged from the interlock projection 3i of the drive shaft 3A and the interlock projection 43c of the third drive gear 43A. Consequently, when the shift clutch member 355 is at the disconnection position, the drive shaft 3A is allowed to rotate in the normal direction relative to the third drive gear 43A.

The drivetrain 330 also has a transmission mechanism for allowing or preventing the second speed path T2 to transmit power (the power of the electric motor 20) from the drive shaft 3A to the driven shaft 3B. In the drivetrain 330, the transmission mechanism is provided by the above-described shift clutch member 355. The shift clutch member 355 can move to the second speed connection position (see FIG. 7B(b)) as well as to the above-described the third speed connection position and the disconnection position. The shift clutch member 355 at the second speed connection position connects the drive shaft 3A and the second drive gear 42A so that they rotate together.

The shift clutch member 355 is rotatable together with the second drive gear 42A. In the drivetrain 330, the shift clutch member 355 and the second drive gear 42A are integrally formed. That is, the shift clutch member 355 and the second drive gear 42A constitute a single metal part. The shift clutch member 355 and second drive gear 42A are rotatable both in the normal and reverse directions relative to the drive shaft 3A. As shown in FIG. 7B(b), when the shift clutch member 355 is at the second speed connection position, the above-described interlock projection 3i of the drive shaft 3A is located inside the interlock recess 355a of the shift clutch member 355. On the other hand, the above-described interlock projection 43c of the third drive gear 43A is not located inside the interlock recess 355a of the shift clutch member 355. That is, the shift clutch member 355 at the second speed connection position is engaged with the drive shaft 3A but not engaged with the third drive gear 43A. Thus, the second drive gear 42A is coupled to the drive shaft 3A through the interlock projection 3i and rotates together with the drive shaft 3A.

When the shift clutch member 355 is at the second speed connection position, the second drive gear 42A is meshed with the second driven gear 42B. Thus, the rotation of the drive shaft 3A (the power of the electric motor 20) is transmitted to the second driven gear 42B through the shift clutch member 355 and the second drive gear 42A. In the drivetrain 330, also when the shift clutch member 355 is at the third speed connection position, the second drive gear 42A is meshed with the second driven gear 42B. However, when the shift clutch member 355 is at the third speed connection position, the rotation of the drive shaft 3A is transmitted to the driven shaft 3B through the third speed path T3, and the driven shaft 3B rotates in the normal direction faster than the second driven gear 42B. Thus, when the shift clutch member 355 is at the third speed connection position, the rotation of the second drive gear 42A is transmitted to the second driven gear 42B, but the workings of the one-way clutch 47 prevent the rotation of the second driven gear 42B from being transmitted to the driven shaft 3B.

Other Modifications

The present invention is not limited to the above-described drivetrains 30, 130, 330, and various modifications and changes may be made thereto.

For example, the locations of the one-way clutches and the number of power transmission paths may be changed as appropriate. FIGS. 8A to 8D each show a diagram of another modification of the drivetrain. The drivetrains 430A to 430D shown in FIGS. 8A to 8D each have two power transmission paths. That is, the drivetrains 430A to 430D each have a first power transmission path T11 and a second power transmission path T13. The location of one-way clutches varies among the drivetrains 430A to 430D. The drivetrains 430A to 430D differ from the drivetrain 30 and the like in that they do not include a neutral clutch member.

Each of the paths T11 and T13 includes two meshing gears: one is mounted on the drive shaft 3A and the other is mounted on the driven shaft 3B. That is, the paths T11 and T13 respectively include a first drive gear 441A and a second drive gear 443A that are both mounted on the drive shaft 3A. The paths T11 and T13 also respectively include a first driven gear 441B and a second driven gear 443B that are both mounted on the driven shaft 3B. The driven gears 441B and 443B are respectively meshed with the drive gears 441A and 443A. The speed ratio between the first drive gear 441A and the first driven gear 441B is greater than the speed ratio between the second drive gear 443A and the second driven gear 443B. The drivetrains 430A, 430B, 430C, and 430D each include one-way clutches 446 and 448 respectively located in the paths T11 and T13. The one-way clutch 446 allows power (the drive power from the electric motor 20) to be transmitted from the drive shaft 3A to the driven shaft 3B, but prevents power (the rotation of the rear wheel 6) from being transmitted from the driven shaft 3B to the drive shaft 3A. In contrast, the one-way clutch 448 allows power transmission from the driven shaft 3B to the drive shaft 3A, but prevents power transmission from the drive shaft 3A to the driven shaft 3B. Consequently, during deceleration of the vehicle, the rotation (power) of the rear wheel 6 is transmitted from the driven shaft 3B to the drive shaft 3A through the second power transmission path T13.

Figure 8A:
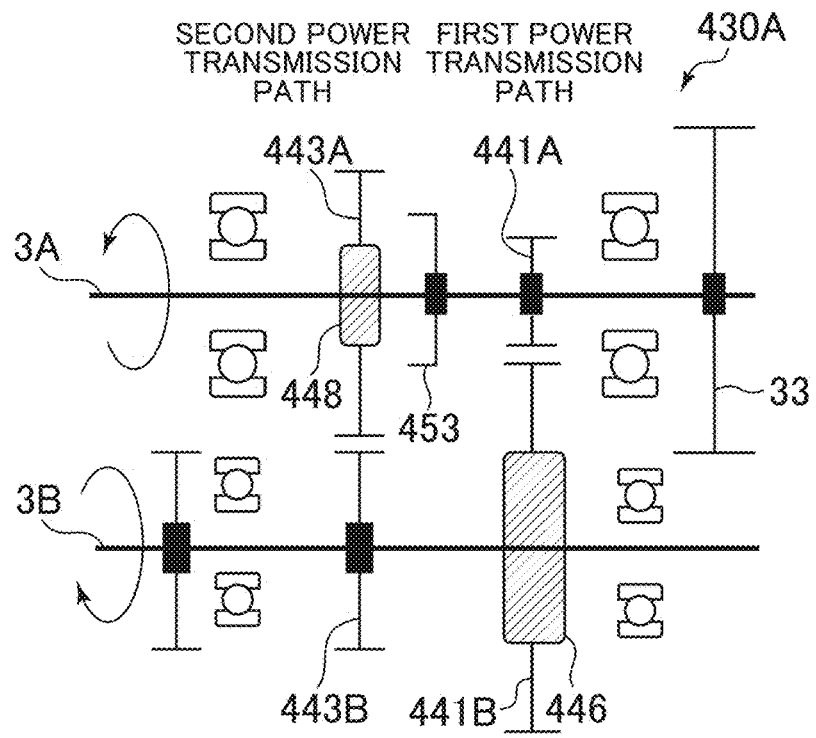
FIG. 8A is a diagram showing an example drivetrain that has two power transmission paths and no neutral clutch member.

The following describes the drivetrain 430A shown in FIG. 8A. In the drivetrain 430A, the one-way clutch 446 of the first power transmission path T11 is mounted on the driven shaft 3B and located between the driven shaft 3B and the first driven gear 441B in the radial direction of the drive shaft, as with the one-way clutch 46 of the drivetrain 30. When the first driven gear 441B rotates in the normal direction faster than the driven shaft 3B, the one-way clutch 446 transmits the rotation of the first driven gear 441B (the drive power from the electric motor 20) to the driven shaft 3B. On the other hand, when the driven shaft 3B rotates in the normal direction faster than the first driven gear 441B, the one-way clutch 446 does not transmit the rotation of the driven shaft 3B (the rotation of the rear wheel 6) to the first driven gear 441B.

The one-way clutch 448 of the first power transmission path T13 is mounted on the drive shaft 3A and located between the drive shaft 3A and the second drive gear 443A in the radial direction of the drive shaft 3A, as with the one-way clutch 48 of the drivetrain 30. When the drive shaft 3A rotates in the normal direction faster than the second drive gear 443A, the one-way clutch 448 does not transmit the rotation of the drive shaft 3A (the drive power from the electric motor 20) to the second drive gear 443A. On the other hand, when the second drive gear 443A rotates in the normal direction faster than the drive shaft 3A, the one-way clutch 448 transmits the rotation of the second drive gear 443A (the rotation of the rear wheel 6) to the drive shaft 3A.

The drivetrain 430A includes a shift clutch member 453 on the shaft (specifically, the drive shaft 3A) on which the one-way clutch 448 is mounted. The shift clutch member 453 is movable axially along the drive shaft 3A between its connection and disconnection positions. The shift clutch member 453 at the connection position is engaged with the second drive gear 443A to connect the drive shaft 3A and the second drive gear 443A so that they rotate together. The shift clutch member 453 at the disconnection position is disengaged from the second drive gear 443A. Consequently, the drive shaft 3A is allowed to rotate in the normal direction relative to the second drive gear 443A, and the rotation of the drive shaft 3A is not transmitted to the second drive gear 443A.

When the shift clutch member 453 is at the disconnection position, the drive power from the electric motor 20 is transmitted from the drive shaft 3A to the driven shaft 3B through the first power transmission path T11. Power transmission from the drive shaft 3A to the second drive gear 443A is blocked by the one-way clutch 448. If the vehicle decelerates when the shift clutch member 453 is at the disconnection position, the second drive gear 443A rotates in the normal direction faster than the drive shaft 3A. Thus, the rotation of the rear wheel 6 is transmitted from the driven shaft 3B to the drive shaft 3A through the second power transmission path T13. In this case, the driven shaft 3B rotates in the normal direction faster than the first driven gear 441B. Thus, power transmission from the driven shaft 3B to the first driven gear 441B is blocked by the one-way clutch 446.

When the shift clutch member 453 is at the connection position, the drive power from the electric motor 20 is transmitted from drive shaft 3A to the driven shaft 3B through the second power transmission path T13. Power transmission from the first driven gear 441B to the driven shaft 3B is blocked by the one-way clutch 446. If the vehicle decelerates when the shift clutch member 453 is at the connection position, the rotation of the rear wheel 6 is transmitted from the driven shaft 3B to the drive shaft 3A through the second power transmission path T13. Also, in this case, the driven shaft 3B rotates in the normal direction faster than the first driven gear 441B. Thus, power transmission from the driven shaft 3B to the first driven gear 441B is blocked by the one-way clutch 446.

Figure 8B:
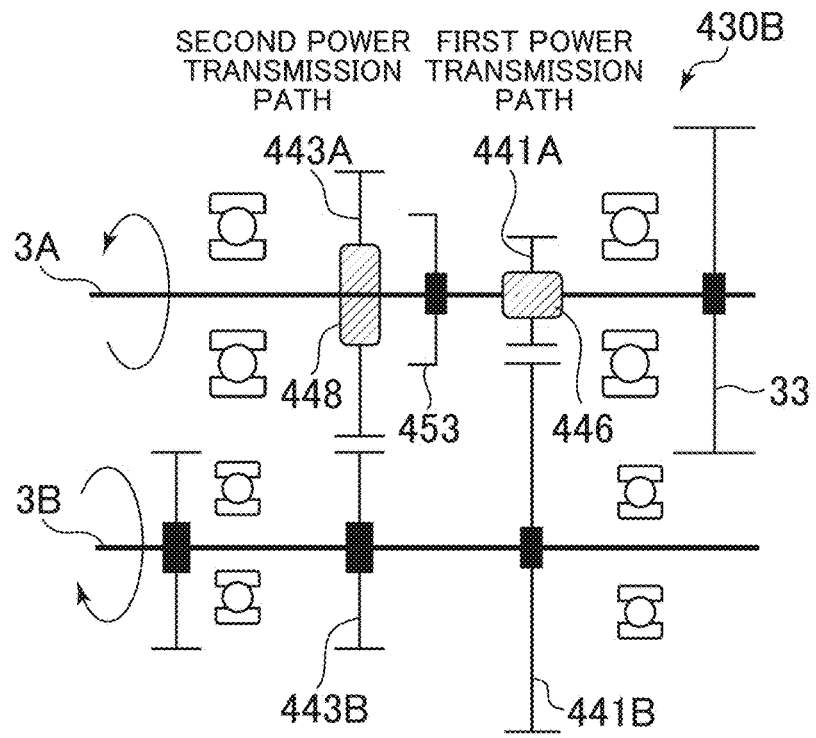
FIG. 8B is a diagram showing a modification of the drivetrain shown in FIG. 8A, which differs from FIG. 8A in the location of a one-way clutch.

In the drivetrain 430B shown in FIG. 8B, the one-way clutch 446 is mounted on the drive shaft 3A and located between the first drive gear 441A and the drive shaft 3A in the radial direction of the drive shaft 3A. When the drive shaft 3A rotates in the normal direction faster than the first drive gear 441A, the one-way clutch 446 transmits the rotation of the drive shaft 3A to the first drive gear 441A. On the other hand, when the first drive gear 441A rotates in the normal direction faster than the drive shaft 3A, the one-way clutch 446 does not transmit the rotation of the first drive gear 441A (the rotation of the rear wheel 6) to the drive shaft 3A. In other respects, the drivetrain 430B is the same as the drivetrain 430A.

Figure 8C:
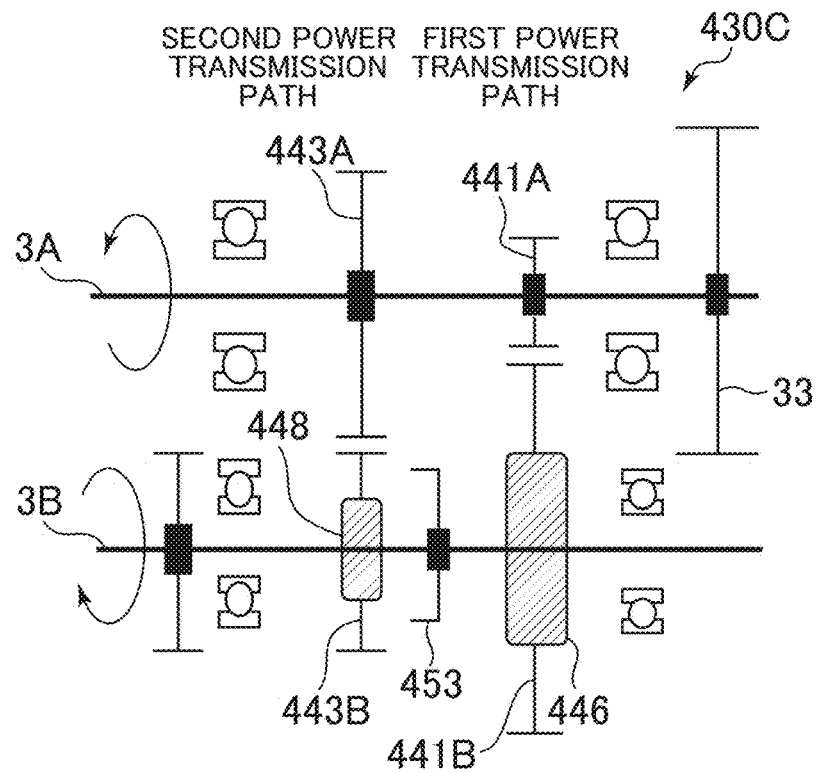
FIG. 8C is a diagram showing another modification of the drivetrain shown in FIG. 8A, which differs from FIG. 8A in the location of a one-way clutch.

In the drivetrain 430C shown in FIG. 8C, the one-way clutch 448 of the second power transmission path T13 and the shift clutch member 453 are mounted on the driven shaft 3B. The one-way clutch 448 is located between the driven shaft 3B and the second driven gear 443B in the radial direction of the driven shaft 3B. When the driven shaft 3B rotates in the normal direction faster than the second driven gear 443B, the one-way clutch 448 transmits the rotation of the driven shaft 3B (the rotation of the rear wheel 6) to the second driven gear 443B. On the other hand, when the second driven gear 443B rotates in the normal direction faster than the driven shaft 3B, the one-way clutch 448 does not transmit the rotation of the second driven gear 443B (the drive power from the electric motor 20) to the driven shaft 3B. The shift clutch member 453 is movable axially along the driven shaft 3B between its connection and disconnection positions. The shift clutch member 453 at the connection position is engaged with the second driven gear 443B to connect the driven shaft 3B and the second driven gear 443B so that they rotate together. The shift clutch member 453 at the disconnection position is disengaged from the second driven gear 443B. Consequently, when the second driven gear 443B rotates in the normal direction faster than the driven shaft 3B, the second driven gear 443B is allowed to rotate relative to the driven shaft 3B. In other respects, the drivetrain 430C is the same as the drivetrain 430A.

Figure 8D:
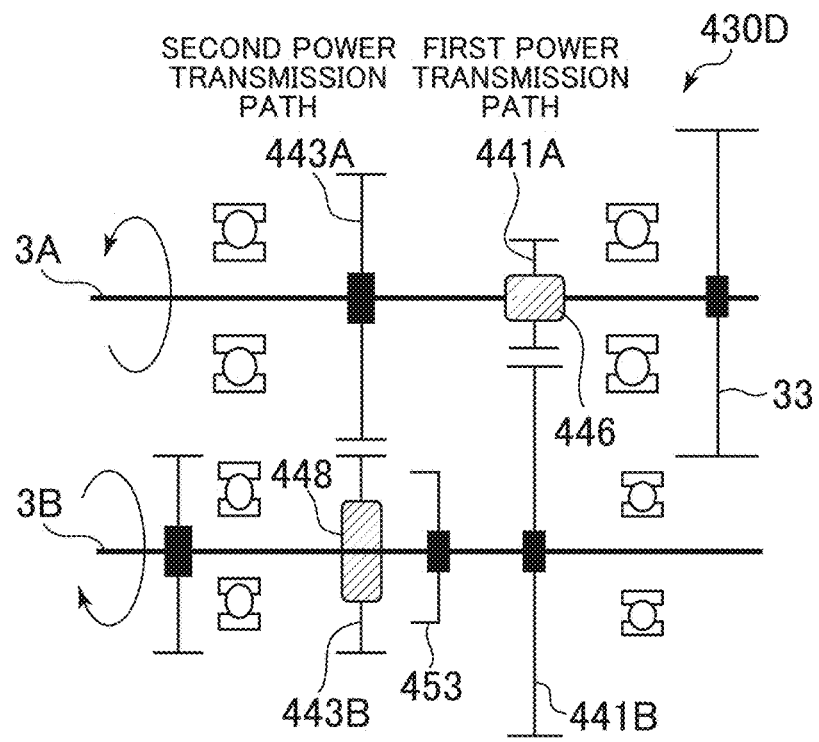
FIG. 8D is a diagram showing still another modification of the drivetrain shown in FIG. 8A, which differs from FIG. 8A in the location of a one-way clutch.

In the drivetrain 430D shown in FIG. 8D, the one-way clutch 446 of the first power transmission path T11 is mounted on the drive shaft 3A and located between the drive shaft 3A and the first drive gear 441A in the radial direction of the drive shaft 3A. When the drive shaft 3A rotates in the normal direction faster than the first drive gear 441A, the one-way clutch 446 transmits the rotation of the drive shaft 3A (the drive power from the electric motor 20) to the first drive gear 441A. On the other hand, when the first drive gear 441A rotates in the normal direction faster than the drive shaft 3A, the one-way clutch 446 does not transmit the rotation of the first drive gear 441A (the rotation of the rear wheel 6) to the drive shaft 3A. The one-way clutch 448 of the second power transmission path T13 and the shift clutch member 453 are mounted on the driven shaft 3B. When the driven shaft 3B rotates in the normal direction faster than the second driven gear 443B, the one-way clutch 448 transmits the rotation of the driven shaft 3B (the rotation of the rear wheel 6) to the second driven gear 443B. On the other hand, when the second driven gear 443B rotates in the normal direction faster than the driven shaft 3B, the one-way clutch 448 does not transmit the rotation of the second driven gear 443B (the drive power from the electric motor 20) to the driven shaft 3B. The shift clutch member 453 is movable axially along the driven shaft 3B between its connection and disconnection positions. The shift clutch member 453 at the connection position is engaged with the second driven gear 443B to connect the driven shaft 3B and the second driven gear 443B so that they rotate together. The shift clutch member 453 at the disconnection position is disengaged from the second driven gear 443B. Consequently, when the second driven gear 443B rotates in the normal direction faster than the driven shaft 3B, the second driven gear 443B is allowed to rotate relative to the driven shaft 3B. In other respects, the drivetrain 430D is the same as the drivetrain 430A.

Figure 9A:
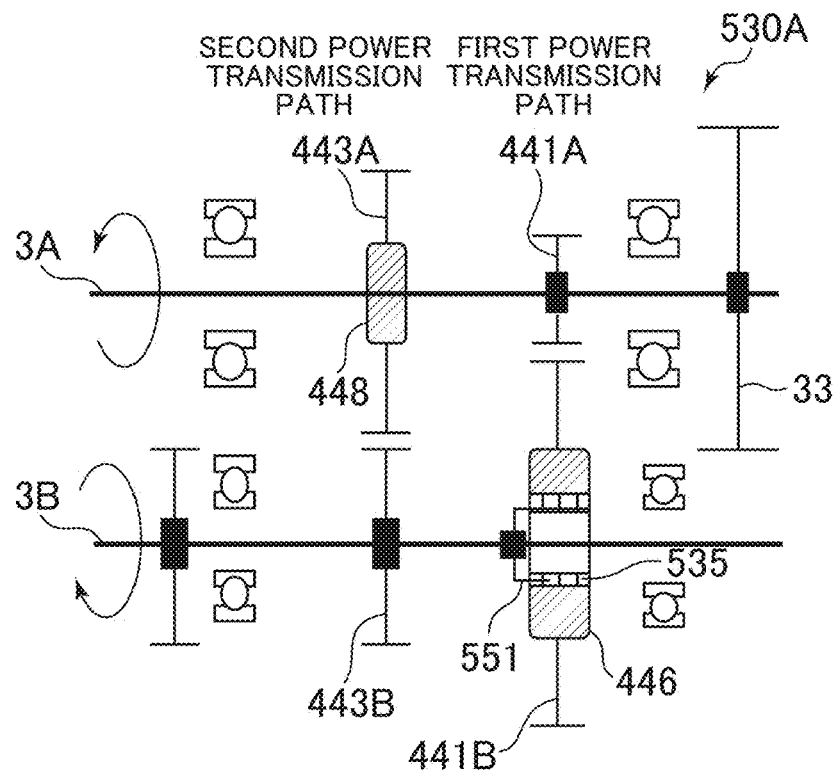
FIG. 9A is a diagram showing an example drivetrain that has two power transmission paths and a neutral clutch member, which shows the one-way clutch at the same location as FIG. 8A.
Figure 9B:
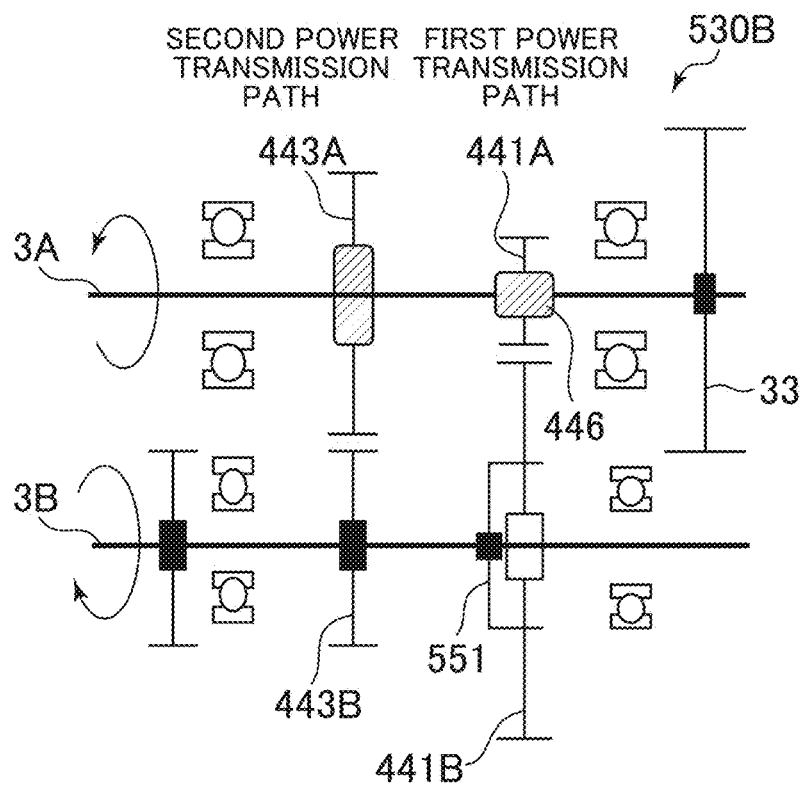
FIG. 9B is a diagram showing a modification of the drivetrain shown in FIG. 9A, which shows the one-way clutch at the same location as FIG. 8B.
Figure 9C:
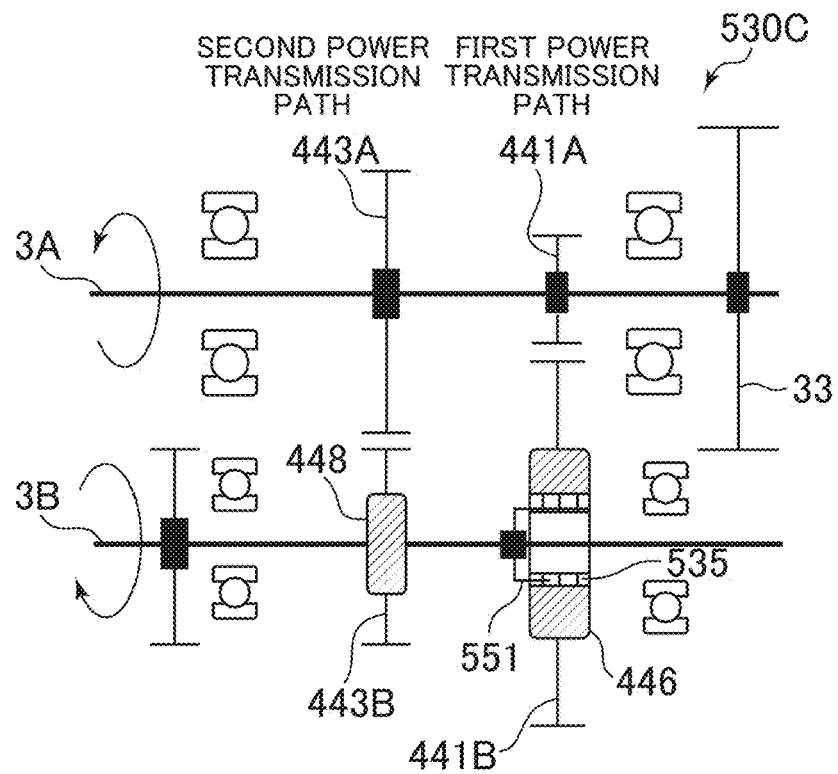
FIG. 9C is a diagram showing another modification of the drivetrain shown in FIG. 9A, which shows the one-way clutch at the same location as FIG. 8C.
Figure 9D:
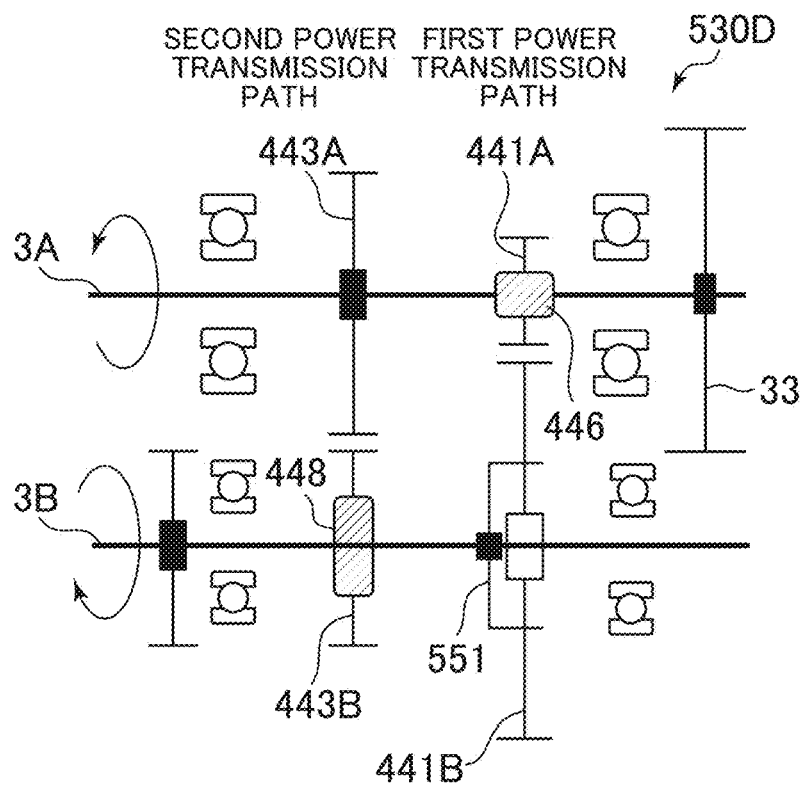
FIG. 9D is a diagram showing still another modification of the drivetrain shown in FIG. 9A, which shows the one-way clutch at the same location as FIG. 8D.

FIGS. 9A to 9D are each a diagram showing still another modification of the drivetrain. In FIGS. 9A and 9D, parts common to the drivetrain 430A and the like described with reference to FIGS. 8A to 8D, are labeled with the same reference characters. The drivetrains 530A, 530B, 530C, and 530D differ from the drivetrains described above in that they do not include a shift clutch member. The following focuses on differences between the drivetrains 530A to 530D, and the drivetrain 430A and the like described with reference to FIGS. 8A to 8D.

The drivetrains 530A, 530B, 530C, and 530D shown in FIGS. 9A to 9D each have the two power transmission paths T11 and T13, as with the drivetrain 430A and the like. The power transmission paths T11 and T13 respectively include the first drive gear 441A and the second drive gear 443A that are both mounted on the drive shaft 3A. The power transmission paths T11 and T13 also respectively include the first driven gear 441B and the second driven gear 443B that are both mounted on the driven shaft 3B. The drivetrains 530A, 530B, 530C, and 530D, each include the one-way clutches 446 and 448 respectively located in the paths T11 and T13.

The following describes the drivetrain 530A shown in FIG. 9A. The arrangement of the one-way clutches 446 and 448 in the drivetrain 530A is the same as that in the drivetrain 430A shown in FIG. 8A. The drivetrain 530A differs from the drivetrain 430A in that it includes a neutral clutch. Specifically, the drivetrain 530A includes a rotary member 535 and a neutral clutch member 551. The first driven gear 441B is rotatable both in the normal and reverse directions relative to the driven shaft 3B. For example, the rotary member 535 is rotatable both in the normal and reverse directions relative to the driven shaft 3B, and the one-way clutch 446 is located outside the rotary member 535 and inside the first driven gear 441B in the radial direction of the shaft. The neutral clutch member 551 rotates together with the driven shaft 3B. The neutral clutch member 551 is movable axially along the driven shaft 3B between its connection and disconnection positions. The neutral clutch member 551 at the connection position is engaged with the rotary member 535, and the neutral clutch member 551 at the disconnection position is disengaged from the rotary member 535. In other respects, the drivetrain 530A shown in FIG. 9A is the same as the drivetrain 430A.

When the neutral clutch member 551 is at the connection position, the power of the electric motor 20 is transmitted from the drive shaft 3A to the driven shaft 3B through the first power transmission path T11. Power transmission from the drive shaft 3A to the second drive gear 443A is blocked by the one-way clutch 448. If the vehicle decelerates, the second drive gear 443A rotates in the normal direction faster than the drive shaft 3A. Thus, the rotation (power) of the rear wheel 6 is transmitted from the driven shaft 3B to the drive shaft 3A through the second power transmission path T13. In this case, the driven shaft 3B rotates in the normal direction faster than the first driven gear 441B. Thus, power transmission from the driven shaft 3B to the first driven gear 441B is blocked by the one-way clutch 446.

The rotary member 535 is rotatable both in the normal and reverse directions relative to the driven shaft 3B. Thus, if the rear wheel 6 rotates in the reverse direction when the neutral clutch member 551 is at the disconnection position (i.e., when the vehicle is backed up), the rotation of the driven shaft 3B is not transmitted to the first driven gear 441B. The rotation of the driven shaft 3B is transmitted to the second drive gear 443A through the second driven gear 443B. The second drive gear 443A rotates in the reverse direction, so the power transmission from the gear 3A to the second drive gear 443A is blocked by the one-way clutch 448.

The arrangement of the one-way clutches 446 and 448 in the drivetrain 530B shown in FIG. 9B is the same as that in the drivetrain 430B shown in FIG. 8B. The drivetrain 530B includes a neutral clutch. Specifically, the first driven gear 441B is rotatable both in the normal and reverse directions relative to the driven shaft 3B. The neutral clutch member 551 is mounted on the driven shaft 3B and rotates together with the driven shaft 3B. The neutral clutch member 551 is movable axially along the driven shaft 3B between its connection and disconnection positions. The neutral clutch member 551 at the connection position is engaged with the first driven gear 441B to connect the first driven gear 441B and the driven shaft 3B so that they rotate together. The neutral clutch member 551 at the disconnection position is disengaged from the first driven gear 441B. Consequently, the driven shaft 3B is allowed to rotate in the reverse direction relative to the first driven gear 441B, and the rotation of the driven shaft 3B (the rotation of the rear wheel 6) is not transmitted to the first driven gear 441B. In other respects, the drivetrain 530B is the same as the drivetrain 430B.

The arrangement of the one-way clutches 446 and 448 in the drivetrain 530C shown in FIG. 9C is the same as that in the drivetrain 430C shown in FIG. 8C. The drivetrain 530C has the same neutral clutch as the drivetrain 530A. That is, the drivetrain 530C includes the rotary member 535 and the neutral clutch member 551 that are mounted on the driven shaft 3B and engageable with each other.

The arrangement of the one-way clutches 446 and 448 in the drivetrain 530D shown in FIG. 9D is the same as that in the drivetrain 430D shown in FIG. 8D. The drivetrain 530D has the same neutral clutch as the drivetrain 530B. That is, the drivetrain 530D includes the neutral clutch member 551 mounted on the driven shaft 3B and engageable with the first driven gear 441B.

SUMMARY OF EMBODIMENTS (1) As described above, the drivetrains 30, 130, and 330 each include the drive shaft 3A to which power is transmitted from the electric motor 20, the driven shaft 3B for transmitting power from the drive shaft 3A to the rear wheel 6, the first speed path T1 that transmits power between the drive shaft 3A and the driven shaft 3B, and the third speed path T3 that transmits power between the drive shaft 3A and the driven shaft 3B. The first speed path T1 includes two meshing gears 41A and 41B, and a one-way clutch 46. The gear 41A is mounted on the drive shaft 3A, and the gear 41B is mounted on the driven shaft 3B. The one-way clutch 46 allows power transmission from the drive shaft 3A toward the driven shaft 3B but prevents power transmission from the driven shaft 3B toward the drive shaft 3A. The third speed path T3 includes two meshing gears 43A and 43B, and a one-way clutch 48. The gear 43A is mounted on the drive shaft 3A, and the gear 43B is mounted on the driven shaft 3B. The one-way clutch 48 allows power transmission from the driven shaft 3B toward the drive shaft 3A but prevents power transmission from the drive shaft 3A toward the driven shaft 3B. The third speed path T3 further includes the shift clutch member 53 movable between connection and disconnection positions relative to the third drive gear 43A. The shift clutch member 53 at the connection position connects the third drive gear 43A and the drive shaft 3A so that they rotate together. The shift clutch member 53 at the disconnection position disconnects the third drive gear 43A and the drive shaft 3A.

Each of these drivetrains 30, 130, and 330 smoothly switches between the first speed path T1 and the third speed path T3 by moving the shift clutch member 53. During deceleration of the vehicle, power is transmitted from the driven shaft 3B to the drive shaft 3A through the third speed path T3, regardless of the position of the shift clutch member 53. Consequently, the drivetrain regulates the rotational speed transmitted to the electric motor 20 and thus generates electricity well using the electric motor 20. The drivetrains 430A and 430B each have the first power transmission path T11 and the second power transmission path T13 corresponding to the first speed path T1 and the third speed path T3, thus producing similar effects.

(2) The drivetrains 30, 130, and 330 each include the drive shaft 3A to which power is transmitted from the electric motor 20, the driven shaft 3B for transmitting power from the drive shaft 3A to the rear wheel 6, the first speed path T1 that transmits power between the drive shaft 3A and the driven shaft 3B, and the third speed path T3 that transmits power between the drive shaft 3A and the driven shaft 3B. The first speed path T1 includes two meshing gears 41A and 41B, and a one-way clutch 46. The gear 41A is mounted on the drive shaft 3A, and the gear 41B is mounted on the driven shaft 3B. The one-way clutch 46 allows power transmission from the drive shaft 3A toward the driven shaft 3B but prevents power transmission from the driven shaft 3B toward the drive shaft 3A. The third speed path T3 includes two meshing gears 43A and 43B, and a one-way clutch 48. The gear 43A is mounted on the drive shaft 3A, and the gear 43B is mounted on the driven shaft 3B. The one-way clutch 48 allows power transmission from the driven shaft 3B toward the drive shaft 3A but prevents power transmission from the drive shaft 3A toward the driven shaft 3B. The first driven gear 41B of the first speed path T1 is rotatable both in the normal and reverse directions relative to the driven shaft 3B. The first speed path T1 further includes the neutral clutch member 51 movable between the connection and disconnection positions relative to the first driven gear 41B. The neutral clutch member 51 at the connection position connects the first driven gear 41B and the driven shaft 3B so that they rotate together. The neutral clutch member 51 at the disconnection position disconnects the first driven gear 41B and the driven shaft 3B.

Each of the drivetrains 30, 130, and 330 prevents the first speed path T1 from transmitting the rotation of the rear wheel 6 to the electric motor 20 by placing the neutral clutch member 51 at the disconnection position when the vehicle is backed up. Thus, the user can push the vehicle backward. During deceleration of the vehicle, power (rotation) is transmitted from the driven shaft 3B to the drive shaft 3A through the third speed path T3, which is different from the first speed path T1 that transmits the power of the electric motor 20 to the rear wheel 6. Consequently, the drivetrain regulates the rotational speed transmitted to the electric motor 20 and thus generates electricity well using the electric motor 20. The drivetrains 530A and 530B each have the first power transmission path T11 and the second power transmission path T13 corresponding to the first speed path T1 and the third speed path T3, thus producing similar effects.

(3) The speed ratio between the gears 43A and 43B in the third speed path T3 is smaller than the speed ratio between the gears 41A and 41B in the first speed path T1. This reduces the rotational speed transmitted to the electric motor 20 through the third speed path T3 during deceleration of the vehicle.

(4) The driven gear 41B of the first speed path T1 has a larger diameter than the drive gear 41A. The one-way clutch 46 is mounted on the driven gear 41B. This makes it easier to lay out the one-way clutch 46.

(5) The one-way clutch 46 is mounted on the driven shaft 3B. The one-way clutch 48 is mounted on the drive shaft 3A. This allows the two one-way clutches 46 and 48 to be arranged without any substantial increase in the width of each of the drivetrains 30, 130, and 330.

(6) The one-way clutch 46 is mounted on the driven shaft 3B and located inside the first driven gear 41B. The one-way clutch 48 is mounted on the drive shaft 3A and located inside the third drive gear 43A. Drive gears usually have larger diameters than the corresponding driven gears. It is thus easier to lay out the one-way clutch 46 in the drivetrain according to (6). In contrast to the one-way clutch 46, the one-way clutch 48 is mounted on the drive shaft 3A. This allows the one-way clutches 46 and 48 to be arranged without any substantial increase in the width of the drivetrain.

(7) The first driven gear 41B has a narrower width than the first one-way clutch, or the second gear may have a narrower width than the second one-way clutch. This avoids a substantial increase in the width of the drivetrain.

(8) The drivetrains 30, 130, and 330 each further include the second speed path T2. The second speed path T2 includes the one-way clutch 47 that allows power transmission from the drive shaft 3A toward the driven shaft 3B but prevents power transmission from the driven shaft 3B toward the drive shaft 3A. The drivetrains 30, 130, and 330 each have a transmission mechanism for allowing or preventing the second speed path T2 to transmit power. This increases the number of selectable power transmission paths, thus providing a speed ratio that suits the driving state of the vehicle.

(9) In the drivetrain 30, the drive gear 42A of the second speed path T2 is rotatable both in the normal and reverse directions relative to the drive shaft 3A. The transmission mechanism includes the shift clutch member 52 movable between the connection and disconnection positions relative to the drive gear 42A. The shift clutch member 52 at the connection position connects the drive gear 42A and the drive shaft 3A so that they rotate together. The shift clutch member 52 at the disconnection position disconnects the drive gear 42A and the drive shaft 3A.

(10) The one-way clutch 46 is mounted on the drive shaft 3A. The shift clutch member 53 and the one-way clutch 48 are mounted on the driven shaft 3B. This makes it easier to lay out the two one-way clutches 46 and 48, and the shift clutch member 53.

(11) The driven shaft 3B is mounted with the rotary member 34 rotatable both in the normal and reverse directions relative to the driven shaft 3B. The one-way clutch 46 is located outside the rotary member 34 and inside the first driven gear 41B. The neutral clutch member 51 is mounted on the same shaft as the one-way clutch 46 and the rotary member 34. The neutral clutch member 51 at the connection position is engaged with the rotary member 34. The neutral clutch member 51 at the disconnection position is disengaged from the rotary member 34.

(12) The driven gear 41B of the first speed path T1 is rotatable both in the normal and reverse directions relative to the driven shaft 3B. The first speed paths T1 and T11 each further include the neutral clutch member 51 movable between the connection and disconnection positions relative to the driven gear 41B. The neutral clutch member 51 at the connection position connects the driven gear 41B and the driven shaft 3B so that they rotate together. The neutral clutch member 51 at the disconnection position disconnects the driven gear 41B and the driven shaft 3B.

(13) The neutral clutch member 51 may be mounted on the driven shaft 3B. The shift clutch member 53 may be mounted on the drive shaft 3A. This makes it easier to lay out the neutral clutch member 51 and the shift clutch member 53.

Although the present invention has been illustrated and described herein with reference to embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A drivetrain comprising:
  a drive shaft to which power is transmitted from an electric motor;
  a driven shaft for transmitting power from the drive shaft to a drive wheel;
  a first power transmission path that transmits power between the drive shaft and the driven shaft; and
  a second power transmission path that transmits power between the drive shaft and the driven shaft, wherein
  the first power transmission path comprises:
    a first gear and a second gear meshed together, where the first gear or the second gear is mounted on the drive shaft and the other of the first gear and second gear is mounted on the driven shaft; and
    a first one-way clutch that transmits power between the first gear and the shaft having the first gear mounted thereon, and allows power transmission from the drive shaft toward the driven shaft but prevents power transmission from the driven shaft toward the drive shaft, the second power transmission path comprises:
  a third gear and a fourth gear meshed together, where the third gear or the fourth gear is mounted on the drive shaft and the other of the third gear or the fourth gear is mounted on the driven shaft; and
  a second one-way clutch that transmits power between the third gear and the shaft having the third gear mounted thereon, and allows power transmission from the driven shaft toward the drive shaft but prevents power transmission from the drive shaft toward the driven shaft, the second one-way clutch being disposed between the third gear and the shaft having the third gear mounted thereon,
the second power transmission path further includes a shift clutch member movable between connection and disconnection positions relative to the third gear,
the shift clutch member at the connection position connects the third gear and the shaft having the third gear mounted thereon so that they rotate together,
the shift clutch member at the disconnection position disconnects the third gear and the shaft having the third gear mounted thereon;
a third power transmission path, wherein
the third power transmission path comprises:
  a fifth gear and a sixth gear which mesh together, one of the fifth and sixth gear mounted on the drive shaft and the other of the first and sixth gear mounted on the driven shaft; and
  a third one-way clutch that transmits power between the fifth gear and the shaft having the fifth gear mounted thereon, and allows power transmission from the drive shaft toward the driven shaft but prevents power transmission from the driven shaft toward the drive shaft, and
wherein the drivetrain has a transmission mechanism for allowing or preventing the third power transmission path to transmit power.

2. The drivetrain according to claim 1, wherein a speed ratio between the third gear and the fourth gear in the second power transmission path is smaller than a speed ratio between the first gear and the second gear in the first power transmission path.

3. The drivetrain according to claim 1, wherein the first gear has a larger diameter than that of the second gear.

4. The drivetrain according to claim 1, wherein the first one-way clutch is mounted on one of the drive shaft and driven shaft, and the second one-way clutch is mounted on the other of the drive shaft and driven shaft.

5. The drivetrain according to claim 1, wherein the first one-way clutch is mounted on the driven shaft and located inside the first gear in a radial direction of the driven shaft, and the second one-way clutch is mounted on the drive shaft and located inside the third gear in a radial direction of the drive shaft.

6. The drivetrain according to claim 5, wherein the first gear has a narrower width in an axial direction than the first one-way clutch, or the third gear has a narrower width in an axial direction than the second one-way clutch.

7. The drivetrain according to claim 1, wherein one of the fifth gear and the sixth gear of the third power transmission path is rotatable both in normal and reverse directions relative to the drive or driven shaft having the one of the fifth gear and sixth gear mounted thereon,
the transmission mechanism includes a shift clutch member movable between connection and disconnection positions relative to the one of the fifth gear or sixth gear of the third power transmission path,
the shift clutch member at the connection position connects the one of the fifth gear or sixth gear and the drive or driven shaft so that they rotate together, and
the shift clutch member at the disconnection position disconnects the one of the fifth gear or sixth gear and the drive or driven shaft.

8. The drivetrain according to claim 1, wherein the first one-way clutch is mounted on one of the drive shaft and driven shaft, and
the shift clutch member and the second one-way clutch are mounted on the other of the drive shaft and driven shaft.

9. The drivetrain according to claim 1, wherein one of the first gear and second gear of the first power transmission path is rotatable both in normal and reverse directions relative to the shaft having the one of the first gear and second gear mounted thereon,
the first power transmission path further includes a neutral clutch member movable between connection and disconnection positions relative to the one of the first gear and the second gear of the first power transmission path,
the neutral clutch member at the connection position connects the one of the first gear and the second gear and the drive or driven shaft so that they rotate together, and
the neutral clutch member at the disconnection position disconnects the one of the first gear and the second gear and the drive or driven shaft.

10. The drivetrain according to claim 9, wherein the neutral clutch member is mounted on one of the drive shaft and driven shaft, and
the shift clutch member is mounted on the other of the drive shaft and driven shaft.

11. An electric vehicle comprising the drivetrain according to claim 1 and an electric motor as a drive source.

* * * * *